US012394917B2

(12) United States Patent
Zebhauser et al.

(10) Patent No.: US 12,394,917 B2
(45) Date of Patent: Aug. 19, 2025

(54) PREFABRICATED ELECTRICAL CABLE, PLUG CONNECTOR ASSEMBLY, AND METHOD AND APPARATUS FOR MANUFACTURING AN ELECTRICAL CABLE

(71) Applicant: Rosenberger Hochfrequenztechnik Gmbh & Co. KG, Fridolfing (DE)

(72) Inventors: Martin Zebhauser, Laufen (DE); Thomas Miedl, Tittmoning (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 334 days.

(21) Appl. No.: 17/795,990

(22) PCT Filed: Jan. 26, 2021

(86) PCT No.: PCT/EP2021/051711
§ 371 (c)(1),
(2) Date: Jul. 28, 2022

(87) PCT Pub. No.: WO2021/151869
PCT Pub. Date: Aug. 5, 2021

(65) Prior Publication Data

US 2023/0268676 A1 Aug. 24, 2023

(30) Foreign Application Priority Data

Jan. 29, 2020 (DE) ..................... 10 2020 102 059.7

(51) Int. Cl.
*H01R 9/05* (2006.01)
*H01R 13/52* (2006.01)
(Continued)

(52) U.S. Cl.
CPC ......... *H01R 9/0518* (2013.01); *H01R 13/521* (2013.01); *H01R 24/40* (2013.01); *H01R 2103/00* (2013.01)

(58) Field of Classification Search
CPC .... H01R 9/0518; H01R 13/521; H01R 24/40; H01R 2103/00
(Continued)

(56) References Cited

U.S. PATENT DOCUMENTS 3,439,294 A 4/1969 Flanagan
3,804,972 A 4/1974 Gommans
(Continued)

OTHER PUBLICATIONS

Office Action issued by the European Patent Office dated Apr. 11, 2023.
(Continued)

*Primary Examiner* — Gary F Paumen
(74) *Attorney, Agent, or Firm* — Randall Danskin P.S.

(57) ABSTRACT

A prefabricated electrical cable comprises an outer conductor shield and an insulation element. The insulation element has a first longitudinal section in which the insulation element is exposed from the outer conductor shield, and a second longitudinal section which adjoins the first longitudinal section and in which the insulation element is enclosed by the outer conductor shield. A cross-sectional area of the insulation element in the first longitudinal section is changed with respect to the cross-sectional area of the insulation element in the second longitudinal section in such a way that the first longitudinal section of the insulation element can be inserted into a first longitudinal section of an outer conductor contact element of an electrical plug connector, and the insulation element is calibrated to the outer conductor contact element.

21 Claims, 13 Drawing Sheets

(51) Int. Cl.
*H01R 24/40* (2011.01)
*H01R 103/00* (2006.01)

(58) Field of Classification Search
USPC ............ 439/578, 582, 607.41, 607.5, 607.51
See application file for complete search history.

(56) References Cited

U.S. PATENT DOCUMENTS 4,622,741 A 11/1986 Dubreuil
5,437,831 A 8/1995 Roose
6,156,975 A 12/2000 Roose
6,319,077 B1 11/2001 Takanashi
8,870,597 B2 * 10/2014 Kawakami ......... H01R 13/6597 439/607.41
9,028,278 B2 * 5/2015 Kanda ................ H01R 13/6474 439/607.51
9,520,700 B2 12/2016 Stepan
2003/0224656 A1 * 12/2003 Yoshida ............. H01R 13/4361 439/578
2013/0171873 A1 7/2013 Kanda
2013/0344737 A1 * 12/2013 Kanda .................. H01R 9/0518 439/607.5
2015/0180183 A1 * 6/2015 Watkins ............. H01R 13/6581 439/578
2015/0244085 A1 * 8/2015 Miyawaki .............. H01R 24/44 439/578
2016/0134032 A1 5/2016 Hall
2018/0261945 A1 * 9/2018 Maesoba .............. H01R 13/422
2019/0199014 A1 * 6/2019 Kanemura ........... H01R 13/113

OTHER PUBLICATIONS

German Search Report dated Sep. 16, 2020.
International Search Report dated Apr. 20, 2021.
Office Action issued by the European Patent Office Action dated Feb. 2, 2023.
Office Action issued by the Chinese Patent Office dated Apr. 3, 2025.

* cited by examiner

PREFABRICATED ELECTRICAL CABLE, PLUG CONNECTOR ASSEMBLY, AND METHOD AND APPARATUS FOR MANUFACTURING AN ELECTRICAL CABLE

CROSS-REFERENCE TO RELATED APPLICATIONS

This US National Stage Non-Provisional patent application claims priority to earlier filed PCT Patent Application No. PCT/EP2021/051711 which was filed on Jan. 26, 2021, and further claims priority to still earlier filed German Patent Application No. 10 2020 102 059.7 which was filed on Jan. 29, 2020.

The entire contents of the aforementioned earlier filed PCT Patent Application and the entire contents of the still earlier filed German Application are both expressly and fully incorporated herein by this reference.

Pursuant to USPTO rules, this priority claim to earlier filed PCT Patent Application No. PCT/EP2021/051711, which was filed on Jan. 26, 2021, and to still earlier filed German Patent Application No. 10 2020 102 059.7 which was filed on Jan. 29, 2020, is also included in the Application Data Sheet (ADS) filed herewith.

FIELD OF INVENTION

The present invention relates to a prefabricated electrical cable, to a plug connector assembly, as well as to a method and an apparatus for fabricating an electrical cable.

BACKGROUND TO THE INVENTION

A plug connector is used for connecting an electrical cable to a further electrical cable or a printed circuit board. The electrical and mechanical attachment of a plug connector to an electrical cable is carried out in a fabrication process of the electrical cable.

In the fabrication of an electrical cable, in particular of a high-frequency cable, the inner conductor is laid bare from the insulation element, the insulation element is laid bare from the outer conductor shield, and the outer conductor shield is laid bare from the cable sheath. Subsequently, a support sleeve may optionally be crimped onto the exposed outer conductor shield or onto the cable sheath, and the outer conductor shield may be folded over the support sleeve. Finally, an electrical cable prefabricated in this manner is inserted into the outer conductor contact element of the plug connector and crimped to the outer conductor contact element.

For the transmission of a high-frequency signal the transition between the electrical cable and the plug connector is optimized in terms of the impedance profile. The impedance of the plug connector as well as the impedance profile in the transition between the electrical cable and the plug connector here is ideally adapted to the reference impedance of the electrical cable, this being 50 Ohm, for example. Alternatively, suitable measures for a counter-compensation of the mismatch are taken in the plug connector. In both cases, reflections of the high-frequency signal along the signal transmission path are minimized.

In the process, the geometric dimensions of the individual components of the plug connection, i.e. of the outer conductor shield, the optional support sleeve, the insulation element, the inner conductor contact element and the outer conductor contact element, have to be ideally tuned to one another in conjunction with an ideally minor manufacturing tolerance. Moreover, the individual manufacturing steps of fabrication have to be carried out with the best possible manufacturing precision.

Depending on the technical requirements of the various fields of application, in particular in the automotive sector, the individual component parts of an electrical cable, i.e. of the inner conductor, the insulation element, the outer conductor shield and the cable sheath, are produced from a specific material and have a specific geometric dimension.

Here, the external diameter of the insulation element above all is important for the fabricating process, because said external diameter for the purpose of adapting the impedance should correspond to the internal diameter of the outer conductor contact element. In this way, an associated outer conductor contact element having a matching internal diameter is to be manufactured for each electrical cable with a respective external diameter of the insulation element. This requires a multiplicity of designs, tools, manufacturing plans and machine programs. Overall, this renders manufacturing more complicated and thus disadvantageously increases the manufacturing costs to a significant extent.

The storage costs are also disadvantageously increased to a significant extent as a result of keeping stock of outer conductor contact elements with different internal diameters.

This is a situation that needs to be improved.

Against this background, the present invention is based on the object of specifying a prefabricated electrical cable by way of which the manufacturing and storage costs mentioned above can be reduced.

Moreover to be specified are a plug connector assembly as well as a method and an apparatus for fabricating an electrical cable, by way of which the manufacturing and storage costs mentioned herein can in each case likewise be minimized.

According to the invention, this object is achieved by a prefabricated electrical cable having the features disclosed herein, by a plug connector assembly having the features disclosed herein, by a method for fabricating an electrical cable having the features disclosed herein, and by an apparatus for fabricating an electrical cable having the features disclosed herein.

A prefabricated electrical cable (hereunder occasionally also referred to only as “electrical cable”), having an outer conductor shield, and an insulation element, wherein the insulation element has a first longitudinal portion in which the insulation element is laid bare from the outer conductor shield, and a second longitudinal portion which adjoins the first longitudinal portion and in which the insulation element is enclosed by the outer conductor shield, wherein a cross-sectional area of the insulation element in the first longitudinal portion in relation to the cross-sectional area of the insulation element in the second longitudinal portion is modified in such a manner that the first longitudinal portion is insertable into a first plug connector portion of an outer conductor contact element of a plug connector, and in the first longitudinal portion the insulation element is calibrated to the outer conductor contact element.

A plug connector assembly, comprising an electrical cable, and a plug connector that is connected to at least one cable end, wherein the electrical cable has an outer conductor shield and an insulation element, wherein the insulation element has a first longitudinal portion in which the insulation element is laid bare from the outer conductor shield, and has a second longitudinal portion which adjoins the first longitudinal portion and in which the insulation element is enclosed by the outer conductor shield, wherein a cross-sectional area of the insulation element in the first longitudinal portion in relation to the cross-sectional area of the insulation element in the second longitudinal portion is modified in such a manner that the first longitudinal portion of the insulation element is inserted into a first plug connector portion of an outer conductor contact element of the plug connector, and in the first longitudinal portion the insulation element is calibrated to the outer conductor contact element.

A method for fabricating an electrical cable, whereby an insulation element in a first longitudinal portion is laid bare from an outer conductor shield, whereby the cross-sectional area of the insulation element in the first longitudinal portion in relation to the cross-sectional area of the insulation element in a second longitudinal portion that adjoins the first longitudinal portion is modified, whereby the electrical cable is inserted into an outer conductor contact element of a plug connector and connected, preferably crimped, to the outer conductor contact element, wherein the cross-sectional area of the first longitudinal portion in relation to the cross-sectional area of the second longitudinal portion is modified in such a manner that the first longitudinal portion of the insulation element is insertable into a first plug connector portion of the outer conductor contact element of the plug connector, and in the first longitudinal portion of the insulation element is calibrated to the outer conductor contact element.

An apparatus for fabricating an electrical cable, having a processing installation for modifying a cross-sectional area in a first longitudinal portion of an insulation element of the electrical cable that has been laid bare from an outer conductor shield, and a joining installation for inserting the electrical cable into an outer conductor contact element of a plug connector, wherein the processing installation is specified in such a manner that said processing installation modifies a cross-sectional area in the first longitudinal portion in such a manner that the first longitudinal portion is insertable into a first plug connector portion of the outer conductor contact element, and wherein the first longitudinal portion of the insulation element is calibrated to the outer conductor contact element.

It is a particular advantage of the present invention that always the same outer conductor contact element of a plug connector having a specific internal diameter is able to be used for the electrical cables having each case different geometric dimensions, in particular having in each case different external diameters of the insulation element.

If the external diameter of the insulation element corresponds to the internal diameter of the outer conductor contact element, the insulation element of the electrical cable, following a joining process, lies against the outer conductor contact element of the plug connector, and the insulation element of the cable is calibrated to the external conductor contact element of the plug connector. Calibrating in this context means that in the first longitudinal portion the cross section of the insulation element, in particular the external diameter of the insulation element, is adapted to the cross section of the outer conductor contact element, particularly to the internal diameter of the outer conductor contact element. The first longitudinal portion of the insulation element is preferably inserted into the outer conductor contact element of the plug connector without an intervening layer of air.

In contrast, if the external diameter of the insulation element differs from the internal diameter of the outer conductor contact element, the cross-sectional area of the longitudinal portion of the insulation element that is laid bare from the outer conductor shield and hereunder is referred to as the first longitudinal portion, can thus be modified according to the invention in relation to the cross-sectional face of the longitudinal portion of the insulation element that is enclosed by the outer conductor shield and hereunder is referred to as a second longitudinal portion. The cross-sectional area of the first longitudinal portion here can be modified in such a manner that the first longitudinal portion of the insulation element is insertable into a longitudinal portion of the outer conductor contact element, and in the first longitudinal portion of the insulation element is calibrated to the outer conductor contact element. The longitudinal portion of the universally applicable outer conductor contact element, into which the first longitudinal portion of the insulation element is inserted and in which said first longitudinal portion is calibrated to the outer conductor contact element, is referred to hereunder as the first plug connector portion.

The modification of the cross-sectional area of the first longitudinal portion so as to correspond to the cross-sectional area of the second longitudinal portion of the insulation element is preferably carried out in an additional fabrication step prior to the process of joining the electrical cable to the plug connector. Alternatively, this additional fabrication step is also able to be carried out while crimping the support sleeve onto the outer conductor shield.

The prefabricated electrical cable according to the invention is thus specified in such a manner that the cross-sectional area in a first longitudinal portion, in which the insulation element is laid bare from the outer conductor shield, in relation to the cross-sectional area of a second longitudinal portion, in which the insulation element is enclosed by the outer conductor shield, is able to be modified in such a manner that the first longitudinal portion of the insulation element is insertable into the first plug connector portion of the outer conductor contact element, and in the first longitudinal portion of the insulation element is calibrated to the outer conductor contact element.

The cross-sectional area of the insulation element in the first and in the second longitudinal portion is in each case a cross-sectional area of which the surface normal vector is oriented so as to be parallel to the longitudinal axis of the electrical cable. A surface normal vector here and hereunder is understood to be a vector that is oriented so as to be perpendicular to the cross-sectional area.

By using a thus universally applicable outer conductor contact element, the manufacturing and storage costs when fabricating an electrical cable having a plug connector can be significantly reduced, despite an additional fabrication step being required.

The electrical cable is preferably a high-frequency cable, i.e. an electrical cable for transmitting a high-frequency signal. A high-frequency signal here is understood to be an electric signal in a frequency range from 5 MHz to 5 THz, i.e. substantially in the frequency range of an electromagnetic wave. A frequency range of this type is suitable for transmitting at a data transmission rate of preferably at least 50 Gbit/s, particularly preferably at least 100 Gbit/s, most particularly preferably at least 200 Gbit/s, furthermore preferably at least 500 Gbit/s, and even furthermore preferably at least 1000 Gbit/s.

A high-frequency cable of this type preferably has an inner conductor, an insulation element enclosing the inner conductor, an outer conductor shield enclosing the insulation element, and a cable sheath enclosing the outer conductor shield. A high-frequency cable which is configured in such a manner and has only a single inner conductor is also referred to as a coaxial cable. Besides, the high-frequency cable may also have a plurality of inner conductors or cable cores, respectively, for example two inner conductors, three inner conductors, four inner conductors and even more inner conductors. These inner conductors by way of a common insulation element are electrically isolated and mechanically spaced apart from one another as well as from the outer conductor shield.

In the case of a plurality of inner conductors, the latter can be twisted within the cable in the manner of a “twisted pair” cable, or else be routed in parallel such as in a “parallel pair” cable, for example.

The outer conductor shield can in particular be a braided outer conductor shield from individual interlaced wires.

Advantageous design embodiments and refinements are disclosed herein, including in the claims as well as from the description with reference to the figures of the drawing.

It is understood that the features mentioned above and yet to be explained hereunder may be used not only in the respective combination stated but also in other combinations or individually, without departing from the scope of the present invention.

The second longitudinal portion of the insulation element in terms of the cross-sectional area thereof preferably remains in the original state and thus not modified. In this way, the prefabricated electrical cable according to the invention is preferably specified in such a manner that the external diameter of the second longitudinal portion in the insulation element differs from the internal diameter of the first plug connector portion in the outer conductor contact element. Inserting the insulation element of the prefabricated cable into the outer conductor contact element of the plug connector can thus be limited solely to the first longitudinal portion of the insulation element, the external diameter of the latter being adapted to the internal diameter of the outer conductor contact element.

In a first preferred development of the invention the cross-sectional area in the first longitudinal portion of the insulation element in relation to the second longitudinal portion is modified in such a manner that the insulation element in the first and in the second longitudinal portion has different external diameters. The external diameter in the first longitudinal portion of the insulation element here corresponds to the preferably constant internal diameter in the first plug connector portion of the outer conductor contact element.

The insulation element along the entire first longitudinal portion and the entire second longitudinal portion preferably has in each case a constant external diameter, said external diameters differing from one another. In this way, the prefabricated electrical cable by way of the first longitudinal portion of the insulation element thereof is able to be inserted in a comparatively simple and simultaneously calibrated manner into the first plug connector portion of the outer conductor contact element, said first plug connector portion likewise preferably having a constant internal diameter. In this way, the external wall in the first longitudinal portion of the insulation element bears in a fully circumferential manner on the internal wall in the first plug connector portion of the outer conductor contact element.

A modification of the cross-sectional area in the first longitudinal portion of the insulation element in such a manner advantageously represents the deformation of the insulation element in the context of the invention that is the simplest in terms of manufacturing.

In a first embodiment of a prefabricated electrical cable according to the invention the external diameter of the insulation element is configured so as to be larger than the internal diameter in the first plug connector portion of the outer conductor contact element. By reducing the external diameter in the entire first longitudinal portion of the insulation element in relation to the external diameter in the second longitudinal portion by means of a swaging or cutting process, the external diameter in the first longitudinal portion of the insulation element can be adapted to the internal diameter in the first plug connector portion of the outer conductor contact element.

To this end, the external diameter of the insulation element in the first longitudinal portion is reduced, preferably by means of a forming process, i.e. by means of a radial stamping using a stamping installation. The stamping installation comprises a stamping ram and a stamping die, each having a semi-cylindrical recess, said recesses being in each case disposed opposite one another. The stamping ram typically moves in the direction of the stationary stamping die as long as the two semi-cylindrical recesses form a common fully cylindrical recess. The diameter of the first longitudinal portion of the insulation element, which is inserted radially within the recess of the stamping ram and of the stamping die, is swaged to the diameter of the closed fully cylindrical recess of the stamping ram and of the stamping die.

Alternatively, the forming process can be carried out by means of, and without limitation, hot-stamping, using a temperature-controlled semi-cylindrical stamping ram and a temperature-controlled semi-cylindrical stamping die.

The modification of the cross-sectional area by means of a separation tool, in particular a separation tool yet to be described in more detail hereunder, may also be provided.

On the one hand, the insulation element can be produced from a porous dielectric insulation material. The porosity of a dielectric insulation material of this type preferably lies between 20% and 75% by volume, particularly preferably between 50% and 75% by volume. Expanded polyethylene or expanded polypropylene, for example, are a porous dielectric insulation material. In the case of a porous dielectric insulation material, the radial compression of the insulation element in the first longitudinal portion by means of stamping or hot-stamping does not lead to any substantial displacement of the insulation material in the axial direction from the first longitudinal portion.

However, if a non-porous or only slightly porous insulation material is present, the porosity thus lies below 20% by volume, or significantly below 20% by volume, respectively. Non-expanded polytetrafluoroethylene or non-expanded polypropylene, for example, is a non-porous or only slightly porous insulation material. In the case of a non-porous or only slightly porous insulation material, a displacement of the insulation material in the axial direction from the first longitudinal portion as a result of the radial compression of the insulation element takes place in both forming processes In order to prevent any undesired displacement of the insulation material in the direction of the second longitudinal portion of the insulation element, a sharp-edged web which is in each case configured in a preferably fully circumferential manner on the stamping ram and on the stamping die cuts into the insulation element simultaneously with the radial stamping of the insulation element in the transition region between the first and the second longitudinal portion. The groove which as a result is configured in a preferably fully circumferential manner in the insulation element and in which the sharp-edged web is held during the stamping procedure has a suitably sized depth. This groove depth is to be conceived as a function of the diameter modification in the first longitudinal portion.

The insulation material, or the insulation layer, which as a result of the radial stamping process is axially displaced in the direction of the cable-proximal end and which can be peeled off by the process yet to be described hereunder, using the separation tool, if required has to be separated from the first longitudinal portion of the insulation element by a cutting process in a further fabrication step. A customary cutting apparatus can be used for this cutting process.

Apart from reducing the external diameter in the first longitudinal portion of the insulation element by means of stamping or hot-stamping, the external diameter in the first longitudinal portion can also be reduced by means of a separation process. By virtue of the filigree work involved in the machining of the external diameter in the insulation element, the separation process preferably takes place by means of, and without limitation, a precisely positionable laser, photon, electron or ion beam, or a water jet. Herein, either the prefabricated electrical cable by way of the insulation element thereof is moved relative to the radiation source, or the radiation source is moved relative to the insulation element of the prefabricated electrical cable.

Alternatively however, subtractive machining methods having subtractive machining tools configured so as to be correspondingly filigree are also conceivable.

Apart from reducing the external diameter along the first longitudinal portion of the insulation element, in a second embodiment of the electrical cable according to the invention other modifications of the cross-sectional area in the first longitudinal portion in relation to the cross-sectional area in the second longitudinal portion are however also possible without any modification of the external diameter. The cross-sectional area in the first longitudinal portion of the insulation element here is to be configured in such a manner that the insulation material of the insulation element in the first longitudinal portion completely fills the intermediate region between the inner conductor of the prefabricated electrical cable and the outer conductor contact element in the first plug connector portion thereof. The external wall in the first longitudinal portion of the insulation element thus bears in a fully circumferential manner on the internal wall in the first plug connector portion of the outer conductor contact element. Moreover, the intermediate region between the inner conductor of the prefabricated electrical cable and the outer conductor contact element of the plug connector in the first longitudinal portion of the insulation element is preferably free of any air pockets.

To this end, at least one recess which preferably extends in the shape of the groove or notch along the entire first longitudinal portion is preferably molded on the surface of the insulation element by means of a suitably configured stamping installation. In order to achieve a suitable coaxial arrangement between the inner conductor of the electrical cable and the outer conductor contact element, a plurality of recesses which are preferably configured as recesses in the shape of grooves or notches distributed uniformly across the circumference of the first longitudinal portion are provided. These recesses in the shape of grooves or notches in the first longitudinal portion are preferably closed when inserted into the outer conductor contact element.

Alternatively, the recesses which preferably run in the shape of grooves or notches on the surface of the first longitudinal portion can also be produced by suitable separation methods.

The individual recesses in the shape of grooves or notches preferably run in a linear and parallel manner on the surface of the first longitudinal portion in the insulation element. However, other suitable profiles of the individual recesses in the shape of grooves or notches are also conceivable, for example zigzag-shaped profiles. Finally, individual mutually offset recess portions, for example individual (slot-shaped) bores along the first longitudinal portion of the insulation element, are also conceivable.

Finally, a plurality of bores which are uniformly distributed in the cross-sectional area of the insulation element and extend in each case along the entire first longitudinal portion are also conceivable. For example, these bores are in each case able to be generated by a drilling or stamping installation which is introduced axially into the insulation element. In order to achieve a single displacement of the insulation material directed toward the plug-proximal end of the electrical cable, the first longitudinal portion of the insulation element may be able to be enclosed by a suitably sized stamping ram and an associated stamping die. Moreover, in the transition between the first and the second longitudinal portion, a sharp-edged web which is in each case configured on the stamping ram and on the stamping die can cut into a preferably fully circumferential groove in the insulation element.

However, the external diameter of the insulation element can also be configured to be smaller than the internal diameter in the first plug connector portion of the outer conductor contact element.

In this third embodiment of a prefabricated electrical cable according to the invention, the external diameter in the first longitudinal portion in relation to the external diameter in the second longitudinal portion of the insulation element by means of a compression process is enlarged in such a manner that the first longitudinal portion of the insulation element is able to be inserted and positioned in a calibrated manner into the first plug connector portion of the outer conductor contact element.

To this end, the first longitudinal portion of the insulation element is compressed in the axial direction by a suitably configured stamping ram which on the end side of the first longitudinal portion carries out an axial compression movement in the direction of the second longitudinal portion. In addition to the axially movable stamping ram, the stamping installation has a further stamping ram which is movable radially in relation to typically stationary stamping die.

The movement of the axially movable stamping ram takes place only once the radially movable stamping ram conjointly with the stamping die forms a common enclosed and fully cylindrical recess in which the first longitudinal portion of the insulation element is concentrically positioned. The diameter of the common enclosed and fully cylindrical recess of the radially movable stamping ram and of the stamping die is to be sized such that the first longitudinal portion of the insulation element after the compression process abuts the internal wall of the closed recess and in this way is imparted the enlarged external diameter thereof.

In order for the compression process to be limited solely to the first longitudinal portion of the insulation element, in the transition between the first and the second longitudinal portion a sharp-edged web which is in each case configured on the radially movable stamping ram and on the stamping die can be cut into a preferably fully circumferential groove in the insulation element.

The length of the first longitudinal portion in the insulation element, the cross-sectional area thereof being modified in relation to the cross-sectional area in the second longitudinal portion of the insulation element, preferably corresponds to at least the length of the first plug connector portion of the outer conductor contact element, or preferably corresponds to the length of the first plug connector portion of the outer conductor contact element, respectively.

A length of the first longitudinal portion in the insulation element of this type is implemented by a suitable size of the deformation tool, for example of the stamping ram and the stamping die, by a precisely performed deformation process, and optionally by an additional cutting process which has the effect of a precise lengthening of the first longitudinal portion.

In order to simplify the insertion of the first longitudinal portion of the insulation element into the first plug connector portion of the outer conductor contact element, in a preferred refinement of the prefabricated electrical cable according to the invention a chamfer is provided at that end of the first longitudinal portion that points in the direction of the plug-proximal end of the electrical cable. This is particularly advantageous in the case of a first longitudinal portion of the insulation element in which the reduction of the cross-sectional area according to the second embodiment of the prefabricated electrical cable according to the invention is not implemented by way of a reduction of the external diameter and the external diameter of the first longitudinal portion is thus enlarged in relation to the internal diameter of the first plug connector portion of the outer conductor contact element.

The cross-sectional area in the first longitudinal portion of the insulation element in relation to the cross-sectional area in the second longitudinal portion of the insulation element is preferably reduced by a factor of more than 0.5, particularly preferably by a factor of more than 0.7, and most particularly preferably by a factor of more than 0.8. In an analogous manner, the cross-sectional area in the first longitudinal portion of the insulation element in relation to the cross-sectional area in the second longitudinal portion of the insulation element is preferably enlarged by a factor of less than 2, particularly preferably by a factor of less than 1.5 and most particularly preferably by a factor of less than 1.2.

The invention furthermore relates to a plug connector assembly which has an electrical cable and plug connector that is connected to at least one cable end.

The electrical cable has an outer conductor shield and an insulation element. The insulation element in turn has a first longitudinal portion, in which the insulation element is laid bare from the outer conductor shield, and a second longitudinal portion which adjoins the first longitudinal portion and in which the insulation element is enclosed by the outer conductor shield.

According to the invention, the cross-sectional area of the insulation element in the first longitudinal portion in relation to the cross-sectional area of the insulation element in the second longitudinal portion is modified in such a manner that the first longitudinal portion of the insulation element is inserted in a calibrated manner into a first plug connector portion of an outer conductor contact element of the plug connector, and in the first longitudinal portion the insulation element is calibrated to the outer conductor contact element. The cross-sectional area in the first and in the second longitudinal portion of the insulation element here is oriented such that the associated surface normal vector runs parallel to the longitudinal axis of the plug connector assembly.

The plug connector is not limited to a specific type of plug connector, wherein the invention is particularly suitable for plug connectors and plug connections for the high-frequency sector. These can be in particular plug connectors or plug connections, respectively, of the type PL, BNC, TNC, SMBA (FAKRA), SMA, SMB, SMS, SMC, SMP, BMS, HFM (FAKRA-Mini), H-MTD, BMK, Mini-Coax or Makax. The plug connector is particularly preferably configured as an H-MTD plug connector.

The plug connector according to the invention can particularly advantageously be used within a vehicle, in particular a motor vehicle. Potential fields of applications are autonomous driving, driver assistance systems, navigation systems, infotainment systems, rear entertainment system, internet connections and wireless Gigabit (IEEE 802.11ad standard). Potential applications relate to high-resolution cameras, for example 4K and 8K cameras, sensors, onboard computers, high-resolution display screens, high-resolution dashboards, 3-D navigation apparatuses and mobile transceivers.

The term "vehicle" here describes any transportation means, in particular overland vehicles, marine vehicles or aircraft, also including spacecraft.

In one preferred embodiment, the plug connector according to the invention has a second plug connector portion that adjoins the first plug connector portion. Situated in this second plug connector portion within the outer conductor contact element is at least one dielectric material. An electrical isolation of the outer conductor contact element from the inner conductor contact element is caused by this at least one dielectric material, on the one hand. On the other hand, a signaling portion having a capacitive or an inductive transmission behavior can be implemented by a suitable selection of material and by a suitable shaping of the at least one dielectric material, said signaling portion compensating for an inductive or capacitive discontinuity as a result of the abrupt change in the cross-sectional area in the transition between the first and the second longitudinal portion of the insulation element contained in the electrical cable.

In the case of a reduction of the cross-sectional area in the transition from the second to the first longitudinal portion of the insulation element contained in the electrical cable, i.e. in the case of a capacitive discontinuity, a signaling portion with a higher inductive transmission behavior than would be the case in the absence of a capacitive discontinuity can be implemented for compensation.

To this end, an insulation element is preferably used in the second plug connector portion within the outer conductor contact element of the plug connector, which has at least one recess extending over the second plug connector portion. The at least one recess, which is filled with air, causes a signaling portion with an effective permittivity, which is less than in the case of an insulation element without a recess, in combination with the dielectric material of the insulation element in the second plug connector portion. In this way, a signaling portion having a higher inductive transmission characteristic than in the case of a signaling portion without a recess is implemented.

In the case of an enlargement of the cross-sectional area in the transition from the second to the first longitudinal portion of the insulation element contained in the electrical cable, i.e. in the case of an inductive discontinuity, a signaling portion with a higher capacitive transmission behavior than would be the case in the absence of a capacitive discontinuity can be implemented for compensation.

To this end, an insulation element is used in the second plug connector portion within the outer conductor contact element of the plug connector, said insulation element being produced from a dielectric material with a higher permittivity than would be the case without any compensation of an inductive discontinuity.

The present invention also extends to a method for fabricating an electrical cable.

In the method according to the invention for fabricating an electrical cable, an insulation element of the electrical cable in a first longitudinal portion is laid bare from an outer conductor shield of the electrical cable, unless the insulation element prior thereto has already been correspondingly laid bare in any other way. Subsequently, the cross-sectional area of the insulation element in the first longitudinal portion is modified in relation to the cross-sectional area of the insulation element in a second longitudinal portion that adjoins the first longitudinal portion. Finally, the electrical cable can be inserted into an outer conductor contact element of a plug connector and be connected, preferably crimped, to the outer conductor contact element (this can take place in the context of the method according to the invention, or independently of the method according to the invention). According to the invention, the cross-sectional area of the first longitudinal portion in relation to the cross-sectional area of the second longitudinal portion is modified in such a manner that the first longitudinal portion of the insulation element is insertable in a calibrated manner into a first plug connector portion of the outer conductor contact element of the plug connector, and in the first longitudinal portion the insulation element is calibrated to the outer conductor contact element.

The configurations of cross-sectional area modifications and the associated processing procedures already discussed above in the context of the prefabricated electrical cable according to the invention may be applied in an analogous manner to the deformation of the cross-sectional area of the first longitudinal portion in relation to the cross-sectional area of the second longitudinal portion in the insulation element.

It is to be pointed out here that the prefabricated electrical cable is inserted into the outer conductor contact element of the plug connector and positioned therein in such a manner that the first longitudinal portion of the insulation element preferably extends within the first plug connector portion of the outer conductor contact element without any axial offset.

The positioning of the prefabricated electrical cable within the outer conductor contact element of the plug connector can be determined by way of a sensor apparatus, preferably a measuring probe. The measuring probe here contacts the end side of an inner conductor contact element that is crimped on the inner conductor of the electrical cable.

Apart from the method steps mentioned, the method according to the invention for fabricating the electrical cable can also comprise additional method steps which are carried out before or after the method steps mentioned. For example, a fabrication process typically also comprises the laying bare of the outer conductor shield from the cable sheath, or the laying bare of the inner conductor from the insulation element as well as the subsequent crimping of an inner conductor contact element onto the exposed inner conductor.

According to one particularly preferred refinement it can be provided that the cross-sectional area in the first longitudinal portion is modified in that the insulation element, by means of a separation tool, is scored in the radial direction, whereupon the separation tool in the radial cutting position thereof in the insulation element is subsequently moved axially relative to the insulation element, in the direction toward the cable end (also referred to above as "front cable end"), so as to peel away an insulation layer to be removed from the insulation element.

As a result of the processing procedure by means of the separation tool described above, the cross-sectional area can be removed using means that are particularly simple in technical terms, on the one hand, this nevertheless guaranteeing a high level of process reliability and precision. The insulation layer, which will typically be of a hollow-cylindrical design, can be scraped and/or torn away, so to speak, from the remaining insulation element, or from the insulation layer of the insulation element that remains on the inner conductor, respectively.

The relative axial movement of the separation tool can be caused by a movement of the separation tool per se, and/or by a movement of the cable.

It can be provided that the cable and/or the separation tool are/is rotated during scoring and/or upon scoring are rotated (for example during the axial movement between the separation tool and the insulation element). The cutting procedure can be further improved as a result.

It can be provided that a zero cut is carried out in the region of the cable end, or exactly on the cable end, so as to sever the insulation layer to be severed by way of a straight cut edge.

The insulation element by way of the separation tool is preferably scored in an at least partially annular manner, but preferably in a completely encircling annular manner, wherein optionally one or a plurality of webs may remain between different partially annular scores.

Two separation tools are preferably provided, in particular two separation tools that can be actuated toward one another and are preferably disposed so as to be exactly opposite one another. Optionally however, more than two separation tools may also be provided. In principle, a single separation tool may also be provided, in particular when the separation tool and/or the cable are/is rotated during the scoring, and/or when the separation tool is configured as a shaped knife with a shape that is at least partially adapted to the profile of the insulation element.

According to one refinement it can be provided that the separation tool has exactly one shaped knife that is adapted to the provided cross-sectional area of the first longitudinal portion. Preferably however, exactly two or more shaped knives that are adapted to the provided cross-sectional area of the first longitudinal portion and for incorporating the radial score are actuated toward one another are provided. The use of exactly shaped knives that are disposed opposite one another has proven particularly suitable.

According to one refinement it can be advantageous for the insulation element immediately before and/or during the modification of the cross-sectional area to be heated at least in the first longitudinal portion. In this way, the insulation element can become softer, this facilitating the machining capability of said insulation element, in particular the machining capability by means of the separation tool described above. For example, it can be provided that the tools (for example the stamping installation, parts of the stamping installation, the separation tool or the cutting apparatus), are correspondingly heated in order to cause a corresponding thermal input into the insulation element. The heat can however also be supplied in another way, for example by way of a hot airflow.

The insulation element is preferably heated only to below the melting temperature thereof, so as not to melt the insulation element but to only soften the latter. Heating to just below the melting temperature may be provided in particular.

In principle however, it can also be provided that the insulation element is heated to the melting temperature thereof, or beyond the melting temperature (for example to just above the melting temperature or optionally also significantly beyond the melting temperature).

In one refinement it can be provided in particular that the separation tool is heated, preferably to an operating temperature between 50° C. and 250° C., particularly preferably to an operating temperature between 170° C. and 200° C.

A heated separation tool having two shaped knives has proven particularly suitable for peeling of the insulation layer in the first longitudinal portion while the separation tool is moved axially relative to the insulation element. In this instance, the separation tool, or the shaped knives, respectively, are able to push along the excess material, or the insulation layer to be removed, respectively.

The invention finally also comprises an apparatus for fabricating an electrical cable. The apparatus according to the invention for fabricating an electrical cable has a processing installation for modifying a cross-sectional area in a first longitudinal portion of an insulation element of the electrical cable that has been laid bare from an outer conductor shield, and a joining installation for inserting the electrical cable into an outer conductor contact element of a plug connector. The processing installation here is specified according to the invention in such a manner that said processing installation modifies a cross-sectional area in the first longitudinal portion of the insulation element in such a manner that the first longitudinal portion in a form-fitting and calibrated manner is insertable into a first plug connector portion of the outer conductor contact element.

The processing installation here is typically an actuated tool which achieves a predefined and adjustable modification of the cross-sectional area in the first longitudinal portion of the insulation element. In the case of stamping or hot-stamping, the actuated tool is a stamping installation. This stamping installation has a positionable stamping ram and an associated stationary stamping die. After setting a position target value to be predefined, the actuation of the positionable stamping ram can take place according to customary physical active principles, i.e. electrically, hydraulically, pneumatically, etc.

In the case of a separation method, the processing installation, or the actuated tool, respectively, can alternatively be a laser, photon, electron, ion or water source which is specified for metering the intensity of the respective beam/jet and for positioning the latter in the first longitudinal portion of the insulation element. Finally, a subtractive machining installation having a subtractive machining tool can also be used in a separation method.

According to a particularly preferable design embodiment, the processing installation can also be a separation tool for scoring the insulation element in the radial direction. The separation tool and/or a cable transport installation can be specified for moving the separation tool, in the state thereof scoring the insulation element, axially in the direction toward the cable end. In this way, any excess insulation layer can be peeled, in particular scraped, from the cable. The separation tool preferably has two shaped knives that can be actuated toward one another, as has been described above. The separation tool can be heatable.

The joining installation is preferably a positionable gripper arm which suitably grips the electrical cable and inserts the latter into and positions the latter in the outer conductor contact element of the plug connector. The joining installation here will preferably use sensor information of the sensor installation mentioned above, said information identifying the current position of the electrical cable in the joining process.

The invention also relates to a computer program product having program code means for carrying out a method for fabricating an electrical cable (in particular according to the embodiments above and hereunder), when the program is executed on a control apparatus of an apparatus for fabricating an electrical cable (in particular according to the embodiments above and hereunder).

The invention also relates to an independent method for fabricating an electrical cable, whereby an outer insulation layer is peeled from an electrical isolator of the electrical cable in that the insulation element by means of a separation tool is scored in the radial direction down to a defined depth, wherein the separation tool in the radial cutting position thereof in the insulation element is subsequently moved axially relative to the insulation element, in the direction toward the cable end, in order for the insulation layer to be peeled from the insulation element. The embodiments above and hereunder can represent optional refinements of this method.

The above design embodiments and refinements can be combined in any arbitrary manner with one another, if expedient. Further possible design embodiments, refinements and implementations of the invention also comprise combinations which have not been mentioned explicitly of features of the invention described above or in the following text with regard to the exemplary embodiments. Here, in particular, a person skilled in the art will also add individual aspects as improvements or additions to the respective basic form of the present invention.

The appended figures of the drawing are intended to impart a deeper understanding of the embodiments of the invention. Said figures visualize embodiments and in conjunction with the description serve for explaining fundamentals and concepts of the invention. Other embodiments and many of the advantages mentioned are apparent from the drawings. The elements of the drawings are not necessarily shown true to scale.

Identical, functionally equivalent and elements, features and components with identical actions in the figures of the drawing are in each case provided with the same reference sign, unless otherwise stated.

The figures are described hereunder in an interrelated and all-embracing manner.

SUMMARY

A principal aspect of the present invention is a prefabricated electrical cable (1), having an outer conductor shield (5) and an insulation element (4), wherein the insulation element (4) has a first longitudinal portion ($L_1$) in which the insulation element (4) is laid bare from the outer conductor shield (5), and a second longitudinal portion ($L_2$) which adjoins the first longitudinal portion ($L_1$) and in which the insulation element (4) is enclosed by the outer conductor shield (5), wherein a cross-sectional area of the insulation element (4) in the first longitudinal portion ($L_1$) in relation to the cross-sectional area of the insulation element (4) in the second longitudinal portion ($L_2$) is modified in such a manner that the first longitudinal portion ($L_1$) is insertable into a first plug connector portion ($S_1$) of an outer conductor contact element (14) of a plug connector (15), and in the first longitudinal portion ($L_1$) the insulation element (4) is calibrated to the outer conductor contact element (14).

A further aspect of the present invention is a prefabricated electrical cable (1) characterized in that the prefabricated electrical cable (1) is specified in such a manner that an external diameter of the second longitudinal portion ($L_2$) of the insulation element (4) differs from an internal diameter of the first plug connector portion ($S_1$) of the outer conductor contact element (14).

A further aspect of the present invention is a prefabricated electrical cable (1) characterized in that the prefabricated electrical cable (1) is specified in such a manner that within the first longitudinal portion ($L_1$) and the first plug connector portion ($S_1$) a region between the outer conductor contact element (14) and an inner conductor (3) of the prefabricated electrical cable (1) is completely filled by the insulation element (4).

A further aspect of the present invention is a prefabricated electrical cable (1) characterized in that in the insulation element (4) a preferably fully circumferential groove (11) is provided in a transition between the first longitudinal portion ($L_1$) and the second longitudinal portion ($L_2$).

A further aspect of the present invention is a prefabricated electrical cable (1) characterized in that the cross-sectional area of the insulation element (4) in the entire first longitudinal portion ($L_1$) is constant, and is reduced in size in relation to the cross-sectional area of the insulation element (4) in the second longitudinal portion ($L_2$).

A further aspect of the present invention is a prefabricated electrical cable (1) characterized in that the external diameter of the insulation element (4) in the entire first longitudinal portion ($L_1$) is constant and is reduced in size in relation to the external diameter of the insulation element (4) in the second longitudinal portion ($L_2$).

A further aspect of the present invention is a prefabricated electrical cable (1) characterized in that at least one recess (18), preferably a plurality of recesses (18), is/are configured on the circumference of the insulation element (4), said recess/recesses (18) in the longitudinal direction extending in each case across the entire first longitudinal portion ($L_1$).

A further aspect of the present invention is a prefabricated electrical cable (1) characterized in that the external diameter of the insulation element (4) in the entire first longitudinal portion ($L_1$) is constant and is enlarged in size in relation to the external diameter of the insulation element (4) in the second longitudinal portion ($L_2$).

A further aspect of the present invention is a prefabricated electrical cable (1) characterized in that the insulation element (4) on a plug-proximal end of the first longitudinal portion ($L_1$) has a chamfer.

A further aspect of the present invention is a plug connector assembly (100), comprising a prefabricated electrical cable (1) and a plug connector (15) that is connected to at least one cable end of the prefabricated electrical cable (1), wherein the first longitudinal portion ($L_1$) of the insulation element (4) is inserted into a first plug connector portion ($S_1$) of an external conductor contact element (14) of the plug connector (15), and wherein the insulation element (4) in the first longitudinal portion ($L_1$) is calibrated to the outer conductor contact element (14).

A further aspect of the present invention is a plug connector assembly (100) characterized in that within the outer conductor contact element (14) of the plug connector (15), at least one dielectric material for the compensation of a change in the impedance between the first longitudinal portion ($L_1$) and the second longitudinal portion ($L_2$) is situated in a second plug connector portion ($S_2$) that adjoins the first plug connector portion ($S_1$).

A further aspect of the present invention is a method for fabricating an electrical cable (1), whereby an insulation element (4) in a first longitudinal portion ($L_1$) is laid bare from an outer conductor shield (5), whereby the cross-sectional area of the insulation element (4) in the first longitudinal portion ($L_1$) in relation to the cross-sectional area of the insulation element (4) in a second longitudinal portion ($L_2$) that adjoins the first longitudinal portion ($L_1$) is modified, whereby the electrical cable (1) is inserted into an outer conductor contact element (14) of a plug connector (15) and connected to the outer conductor contact element (14), wherein the cross-sectional area of the first longitudinal portion ($L_1$) in relation to the cross-sectional area of the second longitudinal portion ($L_2$) is modified in such a manner that the first longitudinal portion ($L_1$) is insertable into a first plug connector portion ($S_1$) of the outer conductor contact element (14) of the plug connector (15), and in the first longitudinal portion ($L_1$) the insulation element (4) is calibrated to the outer conductor contact element (14).

A further aspect of the present invention is a method characterized in that the modification of the cross-sectional area in the first longitudinal portion ($L_1$) takes place by means of compressing the first longitudinal portion ($L_1$).

A further aspect of the present invention is a method characterized in that the modification of the cross-sectional area in the first longitudinal portion ($L_1$) takes place by means of swaging the first longitudinal portion ($L_1$) in a forming process, preferably in a stamping or hot-stamping process.

A further aspect of the present invention is a method characterized in that the modification of the cross-sectional area in the first longitudinal portion ($L_1$) takes place in that the insulation element (4) by means of a separation tool (23) is scored in the radial direction, whereupon the separation tool (23) in the radial cutting position thereof in the insulation element (4) is moved axially relative to the insulation element (4), in the direction toward the cable end, so as to peel away an insulation layer (25) to be removed from the insulation element (4).

A further aspect of the present invention is a method characterized in that the separation tool (23) has at least one shaped knife (24) that is adapted to the shape of the provided cross-sectional area of the first longitudinal portion ($L_1$) and actuatable toward the latter, preferably two shaped knives (24) that are actuatable toward one another.

A further aspect of the present invention is a method characterized in that the insulation material (4), at least in the first longitudinal portion ($L_1$), is heated immediately prior to and/or during the modification of the cross-sectional area.

A further aspect of the present invention is a method characterized in that the separation tool (23) is heated, preferably to an operating temperature between 50° C. and 250° C., particularly preferably to an operating temperature between 170° C. and 200° C.

A further aspect of the present invention is a method characterized in that in parallel to the modification of the cross-sectional area in the first longitudinal portion ($L_1$), a sharp-edged web (10) of a stamping installation (8) is scored into a preferably fully circumferential groove (11) in the insulation element (4) in a transition between the first longitudinal portion ($L_1$) and the second longitudinal portion ($L_2$).

A still further aspect of the present invention is a method characterized in that the modification of the cross-sectional area in the first longitudinal portion ($L_1$) takes place by means of a separation process, preferably by a laser, photon, electron or ion beam, or a water jet.

An event still further aspect of the present invention is an apparatus for fabrication of an electrical cable (1), having a processing installation (21) for modifying a cross-sectional area in a first longitudinal portion ($L_1$) of an insulation element (4) of the electrical cable (1) that has been laid bare from an outer conductor shield (5); and a joining installation (20) for inserting the electrical cable (1) into an outer conductor contact element (14) of a plug connector (15), characterized in that the processing installation (21) is specified in such a manner that said processing installation (21) modifies a cross-sectional area in the first longitudinal portion ($L_1$) in such a manner that the first longitudinal portion ($L_1$) is insertable into a first plug connector portion ($S_1$) of the outer conductor contact element (14), and in the first longitudinal portion ($L_1$) the insulation element (4) is calibrated to the outer conductor contact element (14).

These and other aspects of the present invention are more fully set forth and disclosed herein.

BRIEF DESCRIPTIONS OF THE FIGURES

The present invention will be explained in more detail hereunder by means of the exemplary embodiments set forth in the schematic figures of the drawing, in which.

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1A:
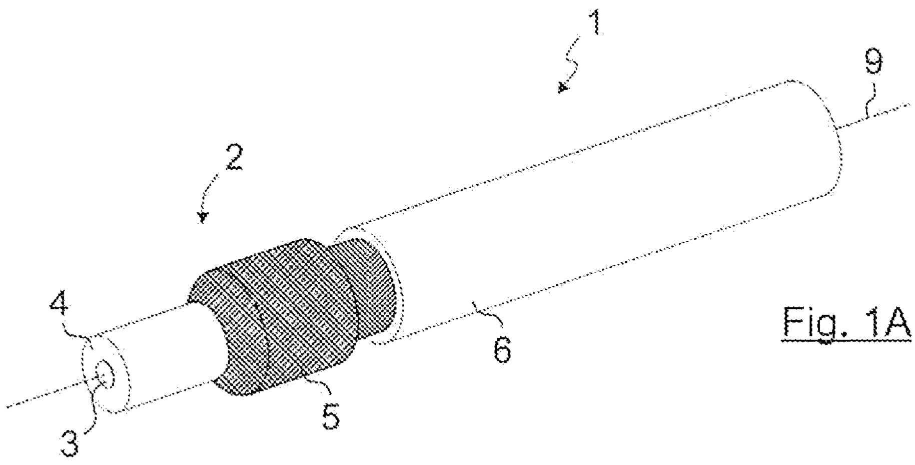
FIG. 1A is an isometric illustration of a first embodiment of an electrical cable to be fabricated showing a first of the individual fabrication steps.

An electrical cable 1, in particular a high-frequency cable, can be seen in FIG. 1A, a number of fabrication steps having already been carried out on the plug-proximal end 2 of said electrical cable 1.

This electrical cable 1, which represents a high-frequency cable, preferably comprises an inner conductor 3 which is enclosed by an insulation element 4. Instead of an inner conductor 3, the electrical cable 1 can also have a pair of inner conductors for transmitting a differential signal. The two inner conductors of the inner conductor pair here are mutually spaced apart and electrically isolated from one another by the insulation element 4. Finally, the electrical cable 1 can also have a plurality of pairs of inner conductors which are in each case disposed so as to be mutually parallel or so as to cross one another, and so as to be mutually spaced apart and electrically isolated by the insulation element 4.

The insulation element 4 can optionally be enclosed by an electrically isolating cable film, not illustrated in the figures. The insulation element 4, or the cable film, respectively, is finally enclosed by an outer conductor shield 5 which is typically constructed from braided individual, electrically conducting wires. Finally, the outer conductor shield 5 is enclosed by an electrically isolating cable sheath 6.

As is derived from FIG. 1A the outer conductor shield 5, preferably in a first fabrication step, in the region of the plug-proximal and 2 of the electrical cable 1 is laid bare from the cable sheath 6.

Figure 2A:
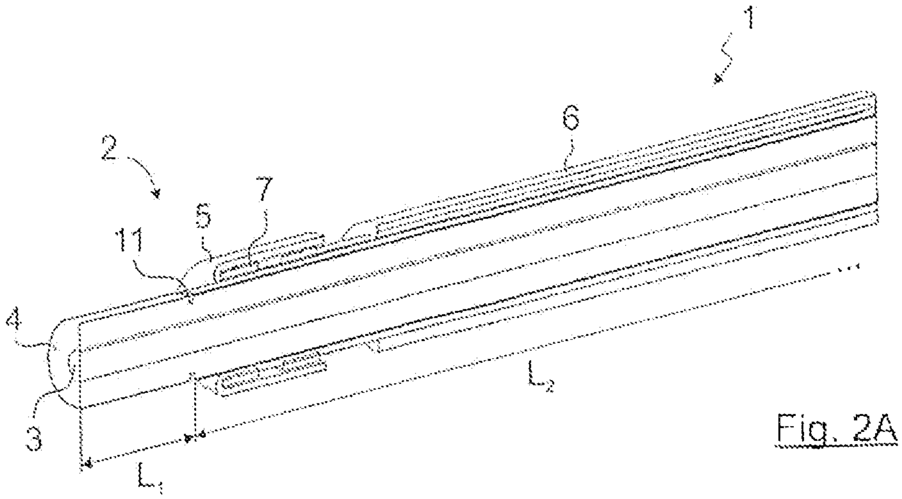
FIG. 2A is a cross-sectional illustration of a first embodiment of an electrical cable to be fabricated, showing a first of the individual fabrication steps.

As is indicated in the isometric illustration in FIG. 1A and more clearly visible in the cross-sectional illustration in FIG. 2A, on the outer conductor shield 5 laid bare from the cable sheath 6 a support sleeve 7 is applied to the plug-proximal end of the high-frequency cable 1 in a further fabrication step. This support sleeve 7 is preferably fastened to the outer conductor shield 5 by means of crimping. The outer conductor shield 5 is folded back about the support sleeve 7.

As a result of the outer conductor shield 5 being folded back about the support sleeve 7, a region of the insulation element 4 that is laid bare from the outer conductor shield 5 is present on the plug-proximal end 2 of the high-frequency cable 1.

Up to this point in the method, the cable fabrication of an electrical cable 1 is known according to the prior art.

Figure 1B:
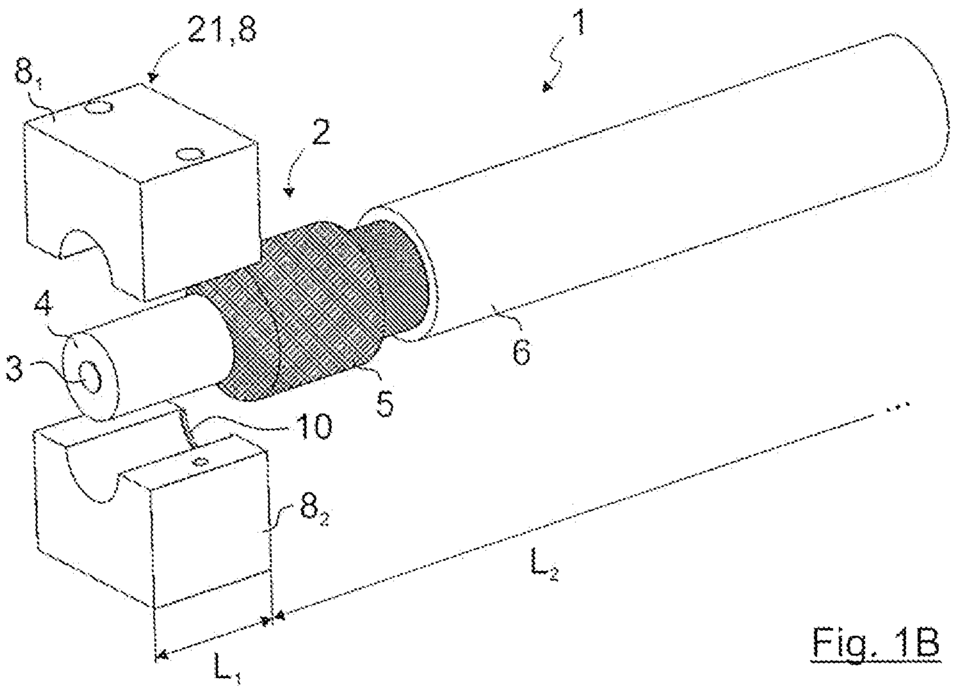
FIG. 1B is an isometric illustration of a first embodiment of an electrical cable to be fabricated showing a further of the individual fabrication steps.

In a further method step of the cable fabrication according to the invention and according to FIG. 1B, the cross-sectional area of the insulation element 4 in a first longitudinal portion $L_1$ (cf. FIG. 2A) in relation to the cross-sectional area in a second longitudinal portion $L_2$ (cf. FIG. 2A) is reduced using a suitable stamping installation 8. A cross-sectional area here is understood to be the cross-sectional area of the insulation element 4 of which the surface normal vector is oriented parallel to the longitudinal axis 9 of the electrical cable 1. Said cross-sectional area thus represents the cross-sectional area of the insulation element 4 which is oriented transversely to the longitudinal axis 9 of the high-frequency cable 1.

The first longitudinal portion $L_1$ preferably extends across the entire longitudinal extent of the electrical cable 1 in which the insulation element 4 is laid bare from the outer conductor shield 5. Consequently, the second longitudinal portion $L_2$ of the insulation element 4 extends across the entire longitudinal extent of the electrical cable 1 in which the insulation element 4 is enclosed by the outer conductor shield 5. Thus, this is the remaining longitudinal extent of the electrical cable 1.

Alternatively, the first longitudinal portion $L_1$ having a reduced cross-sectional area of the insulation element 4 can also extend only in a sub-region of the longitudinal extent of the insulation element 4 laid bare from the outer conductor shield 5.

The reduction of the cross-sectional area in the first longitudinal portion $L_1$ of the insulation element 4 is preferably configured so as to be constant along the entire first longitudinal portion $L_1$.

In the first embodiment of a prefabricated electrical cable 1 according to the invention, the reduction of the cross-sectional area in the first longitudinal portion $L_1$ of the insulation element 4 is implemented by swaging the external diameter of the insulation element 4.

The processing installation 21 which carries out the swaging of the external diameter in the first longitudinal portion $L_1$ of the insulation element 4 is preferably a stamping installation 8.

Figure 1C:
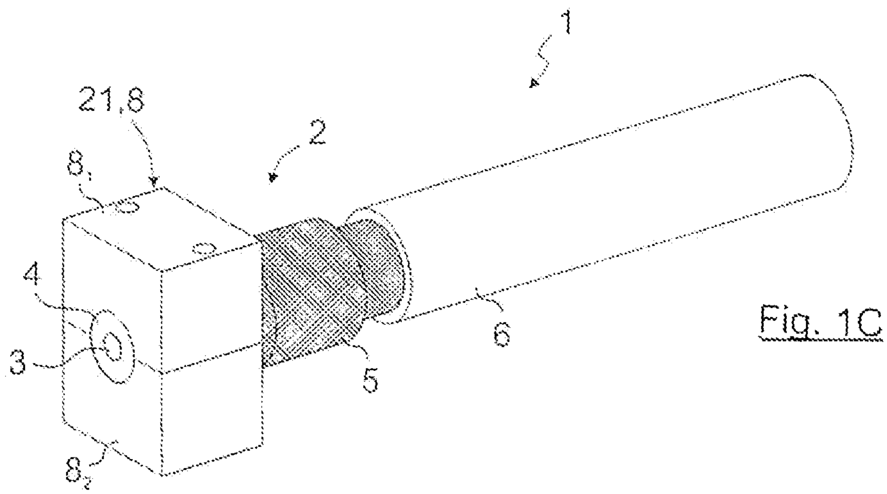
FIG. 1C is an isometric illustration of a first embodiment of an electrical cable to be fabricated showing a further of the individual fabrication steps.

The stamping installation 8 typically has a stamping ram 8$_1$, which is movable radially in relation to the insulation element 4, and a stamping die 8$_2$ which is positioned radially in relation to the insulation element 4. The stamping ram 8$_1$ and the stamping die 8$_2$ each have a cross-sectional profile having a semi-cylindrical recess. The diameter of the semi-cylindrical recess of the stamping ram 8$_1$ and of the stamping die 8$_2$ corresponds to the reduced external diameter in the first longitudinal portion $L_1$ of the insulation element 4 that is to be achieved by the stamping process. When the stamping ram 8$_1$ and stamping die 8$_2$ are converged in the stamping process according to FIG. 1C, the semi-cylindrical recesses thereof form a common fully cylindrical recess in which the first longitudinal portion $L_1$ of the insulation element 4 is axially mounted. As a result thereof, the external diameter of the first longitudinal portion $L_1$ of the insulation element 4 is thus brought to correspond to the reduced internal diameter of the common fully cylindrical recess of the stamping ram 8$_1$ and of the stamping die 8$_2$.

A sharp-edged web 10 which acts like a knife and in the transition between the first longitudinal portion $L_1$ and the second longitudinal portion $L_2$ scores a preferably fully circumferential groove 11 in the insulation element 4 (see to this end FIG. 2A, in particular) is in each case configured on the cable-proximal end of the semi-cylindrical recesses of the stamping ram 8$_1$ and of the stamping die 8$_2$. This preferably fully circumferential groove 11 prevents an undesired displacement of the insulation material from the first longitudinal portion $L_1$ into the second longitudinal portion $L_2$ during the stamping process.

Figure 1D:
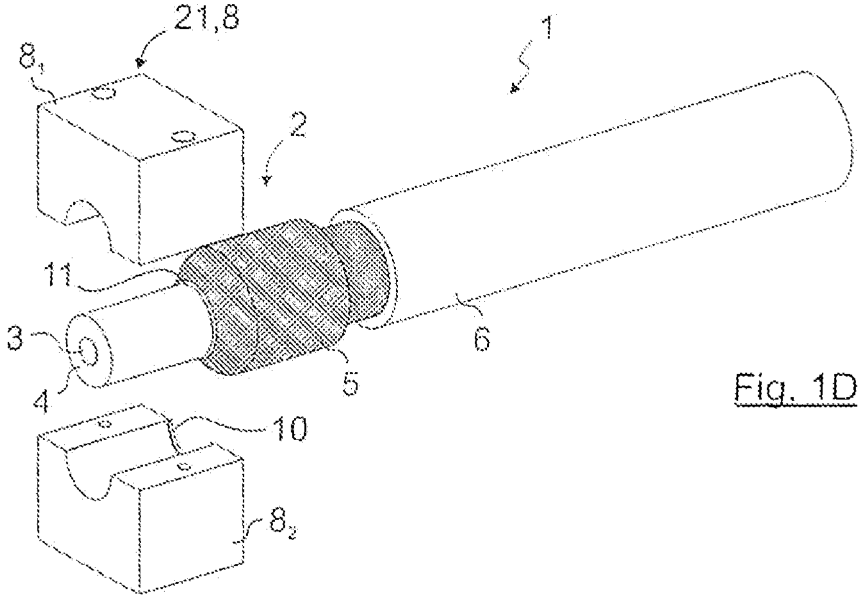
FIG. 1D is an isometric illustration of a first embodiment of an electrical cable to be fabricated showing a further of the individual fabrication steps.

When diverging the stamping ram 8$_1$ and the stamping die 8$_2$ according to FIG. 1D, an electrical cable 1 having an insulation element 4 is created, said insulation element 4 in the first longitudinal portion $L_1$ thereof, on the plug-proximal end 2 thereof, having a reduced external diameter in relation to the external diameter in the second longitudinal portion $L_2$. The insulation material which by virtue of the reduced external diameter is displaced from the first longitudinal portion $L_1$ moves axially in the direction of the plug-proximal end 2 of the electrical cable 1.

Figure 1E:
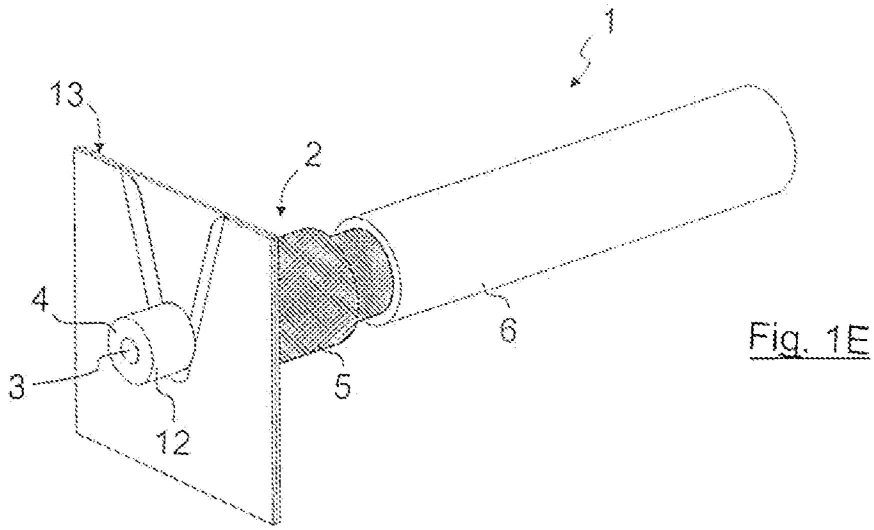
FIG. 1E is an isometric illustration of a first embodiment of an electrical cable to be fabricated showing a further of the individual fabrication steps.
Figure 1F:
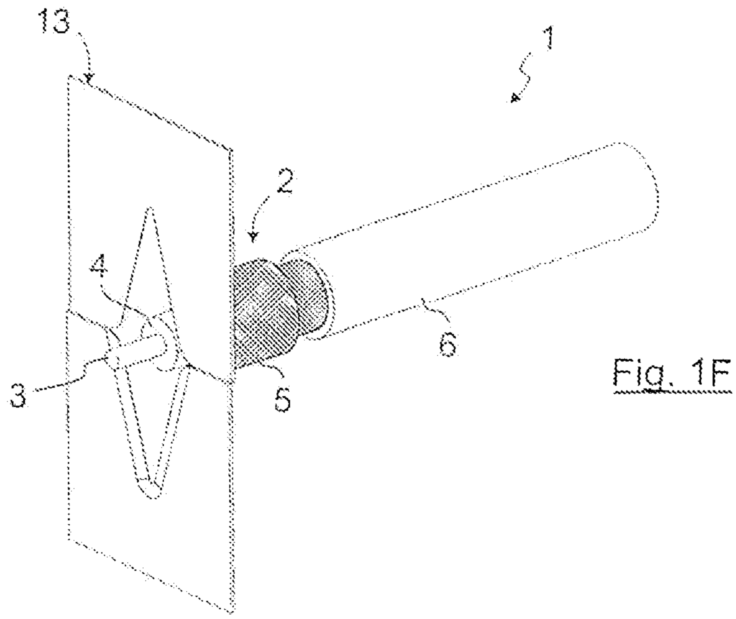
FIG. 1F is an isometric illustration of a first embodiment of an electrical cable to be fabricated showing a further of the individual fabrication steps.
Figure 1G:
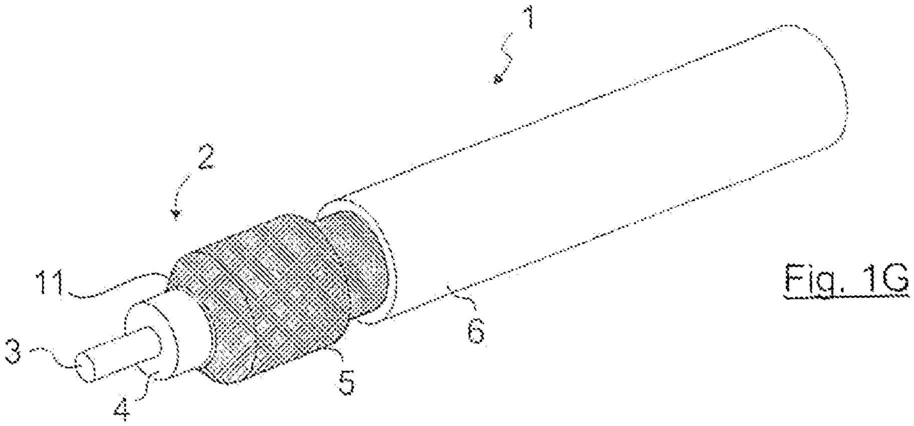
FIG. 1G is an isometric illustration of a first embodiment of an electrical cable to be fabricated showing a further of the individual fabrication steps.

In a further fabrication step according to FIG. 1E the plug-proximal end region 12 of the insulation element 4 is removed using a cutting apparatus 13. As is derived from FIG. 1F, the inner conductor 3 at the plug-proximal end of the high-frequency cable 1 is laid bare from the insulation element 4. The inner conductor 3 here is in particular also laid bare from the insulation material which has been axially displaced from the first longitudinal portion $L_1$ by the stamping process.

As an alternative to the mechanical stamping process, a hot-stamping process may also be used. In the latter, the stamping ram 8$_1$ and the stamping die 8$_2$ are elevated to a suitable temperature. The increased temperature of the stamping ram 8$_1$ and of the stamping die 8$_2$ during the stamping process leads to the insulation material melting in the adjacent, preferably sleeve-shaped, region within the first longitudinal portion $L_1$ of the insulation element 4. The melted insolation material is suctioned off axially or radially from the first longitudinal portion $L_1$ by way of a suitably configured suctioning apparatus.

Figure 2B:
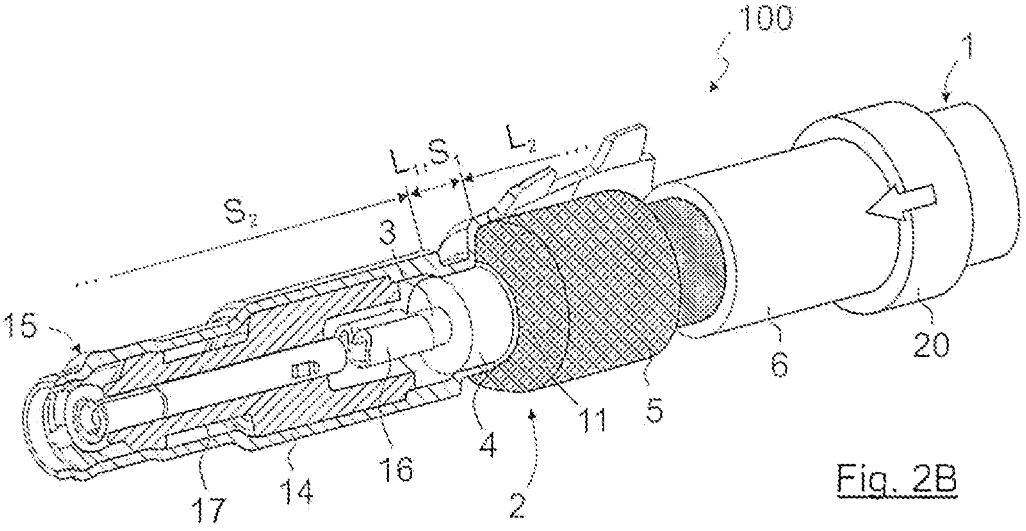
FIG. 2B is a cross-sectional illustration of a first embodiment of an electrical cable to be fabricated, showing a further of the individual fabrication steps.

In a next fabrication step, the electrical cable prefabricated in this way, in a joining process having a joining installation 20 according to FIG. 2B, is inserted into an outer conductor contact element 14 of a plug connector 15.

The assembly composed of the electrical cable 1 and the plug connector 15 is presently referred to as a plug connector assembly 100.

The joining installation 20 is typically an axially positionable gripper arm which grips the electrical cable 1 on the cable sheath 6 in the second longitudinal portion $L_1$ of the insulation element 4 and axially positions the latter. In particular, the first longitudinal portion $L_1$ of the insulation element 4 here is positioned in a first plug connector portion $S_1$ of the outer conductor contact element 14 of a plug connector 15 in such a manner that the first longitudinal portion $L_1$ in the axial direction is preferably situated exactly within the first plug connector portion $S_1$. To this end, the longitudinal extent of the first longitudinal portion $L_1$ preferably corresponds to the longitudinal extent of the first plug connector portion $S_1$.

According to the invention, the first longitudinal portion $L_1$ of the insulation element 4 is inserted into the first plug connector portion $S_1$ of the outer conductor contact element 14 and is calibrated to the outer conductor contact element 14. In this way, the external diameter of the insulation element 4 in the first longitudinal portion $L_1$ preferably corresponds to the internal diameter of the first plug connector portion $S_1$ of the outer conductor contact element 14. The original external diameter of the insulation element 4, which is still maintained in the second longitudinal portion $L_2$ of the insulation element 4, within the first longitudinal portion $L_1$ is thus adapted to the internal diameter of the first plug connector portion $S_1$ of the outer conductor contact element 14 in the fabrication method according to the invention.

This adaptation of the external diameter of the insulation element 4 to the internal diameter of the outer conductor contact element 14 is also referred to as calibration. In this case, the external diameter profile of the insulation element 4 associated with the electrical cable 1 is adapted to the internal diameter profile of the outer conductor contact element 14 in the plug connector 15.

For the sake of completeness, an inner conductor contact element 16 of the plug connector 15 which, preferably by means of crimping, is connected to the inner conductor 3 of the high-frequency cable is illustrated in FIG. 2B. A suitably configured insulation element 17 within the plug connector 15 for electrically isolating and spacing is inserted between the inner conductor contact element 16 and the outer conductor contact element 14.

Figure 2C:
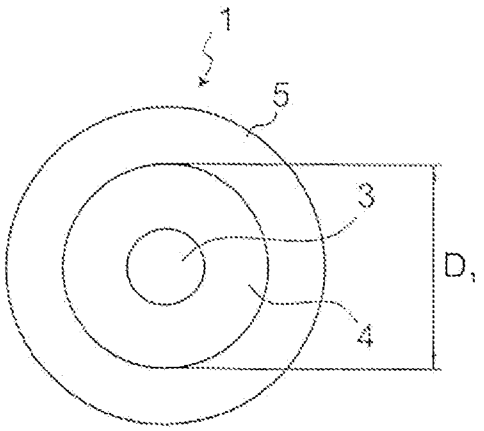
FIG. 2C is a cross-sectional illustration of a first embodiment of an electrical cable to be fabricated, showing a further of the individual fabrication steps.
Figure 2D:
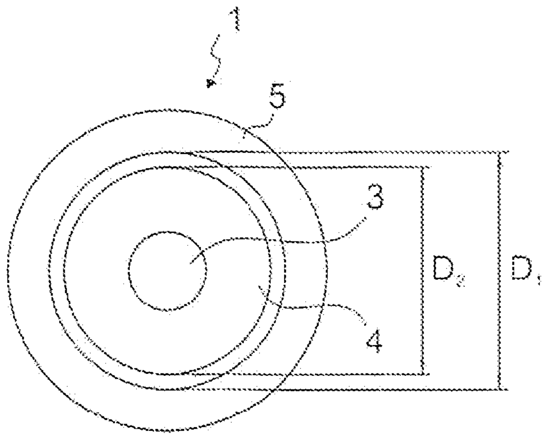
FIG. 2D is a cross-sectional illustration of a first embodiment of an electrical cable to be fabricated, showing a further of the individual fabrication steps.
Figure 2E:
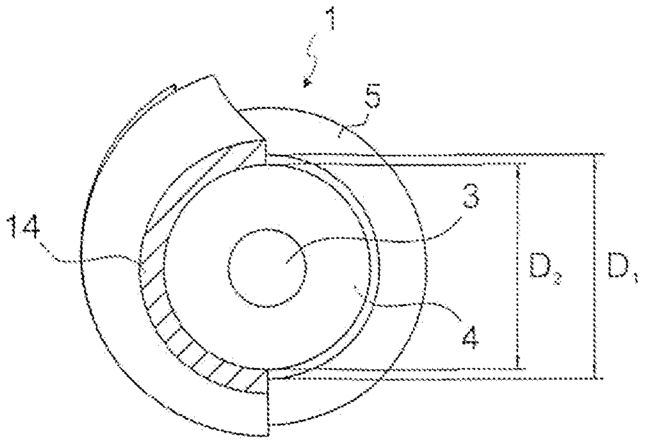
FIG. 2E is a cross-sectional illustration of a first embodiment of an electrical cable to be fabricated, showing a further of the individual fabrication steps.

The cross-sectional profile of the substantial component parts of the first embodiment of the prefabricated electrical cable 1 according to the invention is in each case schematically illustrated, i.e. not true to scale, in the individual fabrication steps in FIGS. 2C, 2D and 2E:

The cross-sectional profile of the substantial component parts of the electrical cable 1 prior to the modification of the cross-sectional area in the first longitudinal portion $L_1$ of the insulation element 4 according to the invention is derived from FIG. 2C. The insulation element 4 across the entire longitudinal extent of the electrical cable 1 has a substantially constant external diameter $D_1$. As is derived from FIG. 2E, this external diameter $D_1$ of the insulation element 4 is enlarged in relation to the internal diameter $D_2$ in the first plug connector portion $S_1$ of the outer conductor contact element 14. It is thus not possible for the prefabricated electrical cable 1 according to FIG. 2C to be inserted into the outer conductor contact element 14 of the plug connector 15.

A reduction of the cross-sectional area in the first longitudinal portion $L_1$ of the insulation element 4 in the context of reducing the external diameter in the first longitudinal portion $L_1$ of the insulation element 4 from the larger external diameter $D_1$ to the smaller external diameter $D_2$ according to FIG. 2D, makes it possible for the first longitudinal portion $L_1$ of the insulation element 4 to be inserted in a calibrated manner into the first plug connector portion $S_1$ of the outer conductor contact element 14, according to FIG. 2E.

In a second embodiment of a prefabricated electrical cable 1 according to the invention the original external diameter of the insulation element 4 is likewise enlarged in relation to the internal diameter of the outer connector contact element 14. In this case too, it is not possible for the prefabricated electrical cable 1, in particular the first longitudinal portion $L_1$ of the insulation element 4, to be inserted into the first plug connector portion $S_1$ of the outer conductor contact element 14. According to the invention, the cross-sectional area of the insulation element 4 within the first longitudinal portion $L_1$ here is likewise reduced in relation to the cross-sectional area within the second longitudinal portion $L_2$.

Figure 3A:
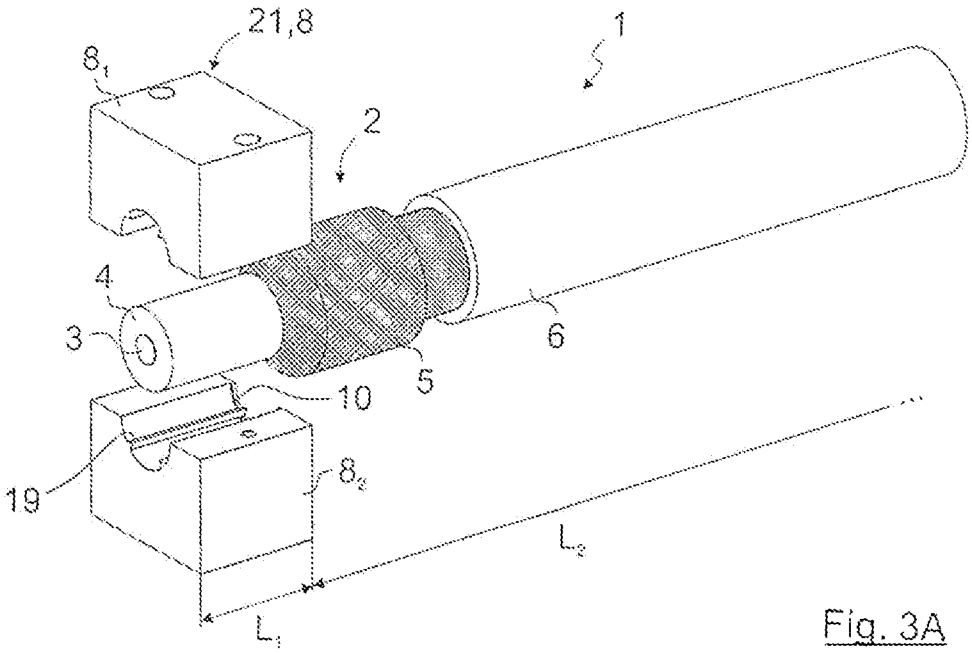
FIG. 3A is a first isometric illustration of a second embodiment of an electrical cable to be fabricated in the individual fabrication steps.
Figure 3B:
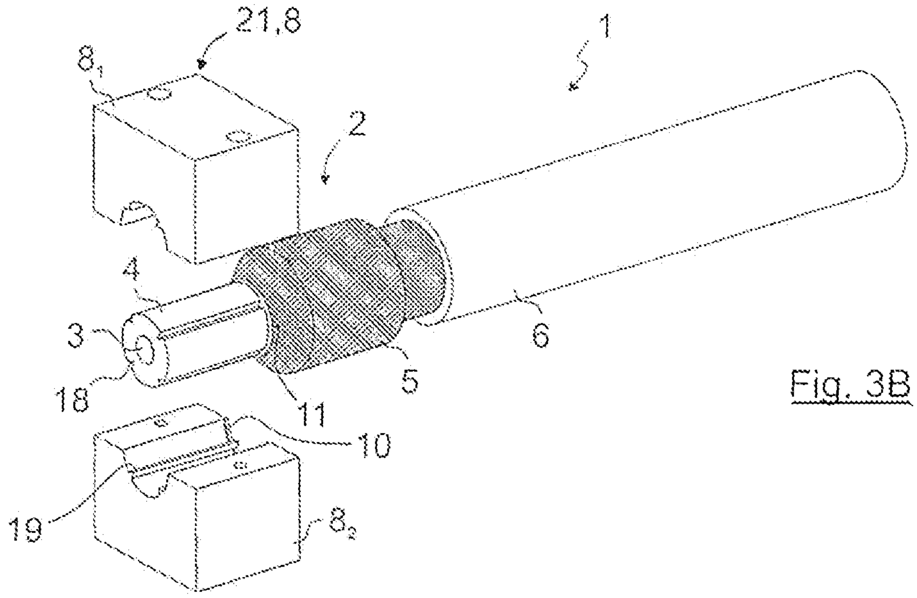
FIG. 3B is a second isometric illustration of a second embodiment of an electrical cable to be fabricated in the individual fabrication steps.

To this end, according to FIGS. 3A and 3B, a plurality of recesses 18 which are distributed on the circumference of the first longitudinal portion $L_1$ and extend in the longitudinal direction are shaped in the first longitudinal portion $L_1$ of the insulation element 4 in a stamping process. These recesses 18 are in each case preferably configured as notches, in particular as V-shaped notches according to FIG. 4A. Moreover, U-shaped notches or notches having a different cross-sectional profile can also be used. The stamping ram $\mathbf{8}_1$ and the stamping die $\mathbf{8}_2$ each have a semi-cylindrical recess, the diameter of the latter corresponding to the original external diameter in the first longitudinal portion $L_1$ of the insulation element 4. For configuring the notch-shaped recesses 18, webs 19 that run in each case in the longitudinal direction are configured on the internal circumference of the semi-cylindrical recesses of the stamping ram $\mathbf{8}_1$ and of the stamping die $\mathbf{8}_2$. These webs 19 each have a cross-sectional profile which corresponds to the cross-sectional profile of the notch-shaped recesses 18.

A sharp-edged web 10 is likewise configured in each case on the cable-proximal end of the semi-cylindrical recesses of the stamping ram $\mathbf{8}_1$ and of the stamping die $\mathbf{8}_2$, said web 10 in the stamping process scoring a preferably fully circumferential groove 11 in the transition between the first longitudinal portion $L_1$ and the second longitudinal portion $L_2$. The sharp-edged web 10 prevents a disadvantageous displacement of the insulation material from the notch-shaped recesses 18 being formed in the first longitudinal portion $L_1$ in the direction of the second longitudinal portion $L_2$ of the insulation element 4 during the stamping process.

The insulation material which in the stamping process is displaced from the notch-shaped recesses 18 in the first longitudinal portion $L_1$ of the insulation element 4, is displaced in the actual direction toward the plug-proximal end of the prefabricated electrical cable 1. This insulation material displaced in the axial direction, in a manner analogous to the first embodiment of a prefabricated electrical cable 1, is removed in a cutting process by means of a cutting apparatus 13 according to FIGS. 1E and 1F.

In a further fabrication step, the electrical cable 1 is inserted into the plug connector 15. The notch-shaped recesses 18 in the first longitudinal portion $L_1$ of the insulation element 4 here are compressed when being inserted into the first plug connector portion $S_1$ of the outer conductor contact element 14, so that the original external diameter of the first longitudinal portion $L_1$ of the insulation element 4 in the inserted state is adapted to the smaller internal diameter $D_2$ of the outer conductor contact element 14. This reduction of the external diameter in the first longitudinal portion $L_1$ of the insulation element 4 is caused by closing the notch-shaped recesses 18.

Figure 4A:
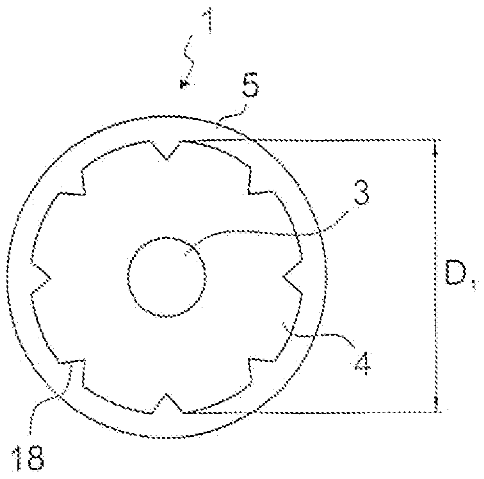
FIG. 4A is a first cross-sectional illustration of a second embodiment of an electrical cable to be fabricated according to the individual fabrication steps.
Figure 4B:
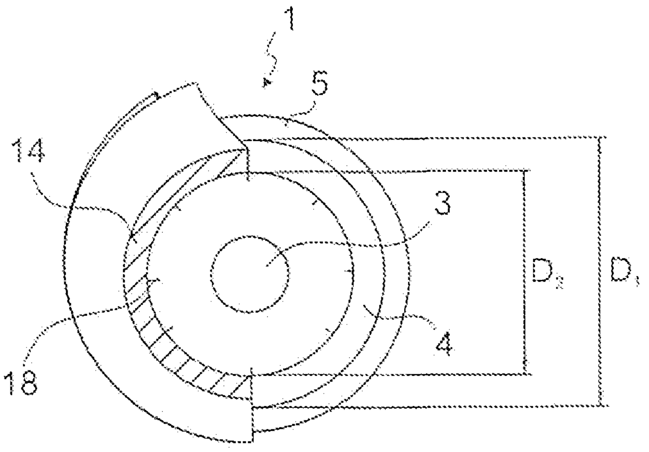
FIG. 4B is a second cross-sectional illustration of a second embodiment of an electrical cable to be fabricated according to the individual fabrication steps.

The cross-sectional profile of the substantial component parts of the second embodiment of the prefabricated electrical cable 1 according to the invention is in each case schematically illustrated, i.e. not true to scale, in the individual fabrication steps in FIGS. 4A and 4B:

A cross-sectional profile of the second embodiment of a prefabricated electrical cable 1 in which a plurality of notch-shaped recesses 18 are configured so as to be distributed on the circumference of the first longitudinal portion after the stamping process can be seen in FIG. 4A. The external diameter $D_1$ in the first longitudinal portion $L_1$ of the insulation element 4 after the stamping process corresponds to the external diameter $D_1$ before the stamping process and is unmodified in relation to the external diameter in the second longitudinal portion $L_2$ of the insulation element 4.

The cross-sectional profile of the electrical cable 1 inserted into the outer conductor contact element 14 can be seen in FIG. 4B. The external diameter $D_1$ in the first longitudinal portion $L_1$ of the insulation element 4 corresponds to the reduced internal diameter $D_1$ of the outer conductor contact element 14. As a result of the reduction of the external diameter in the first longitudinal portion $L_1$ of the insulation element 4, the individual notch-shaped recesses 18 are closed. In FIG. 4B this is schematically illustrated by the dashes provided at the respective locations of the insulation element 4.

In a third embodiment of a prefabricated electrical cable 1 according to the invention the external diameter of the insulation element 4 is reduced in relation to the internal diameter of the outer conductor contact element 14 in the first plug connector portion $S_1$. In this case, it is possible for the prefabricated electrical cable 1 to be inserted into the outer conductor contact element 14 of the plug connector 15. However, a layer of air is situated between the first longitudinal portion $L_1$ of the insulation element 4 and the first plug connector portion $S_1$ of the outer conductor contact element 14. The radial extent of the electrical cable 4 is not adapted or calibrated, respectively, to the radial internal extent of the plug connector 15.

With a view to calibrating, according to the invention the cross-sectional area of the insulation element 4 within the first longitudinal portion $L_1$ here is enlarged in relation to the cross-sectional area within the second longitudinal portion $L_2$.

Figure 5A:
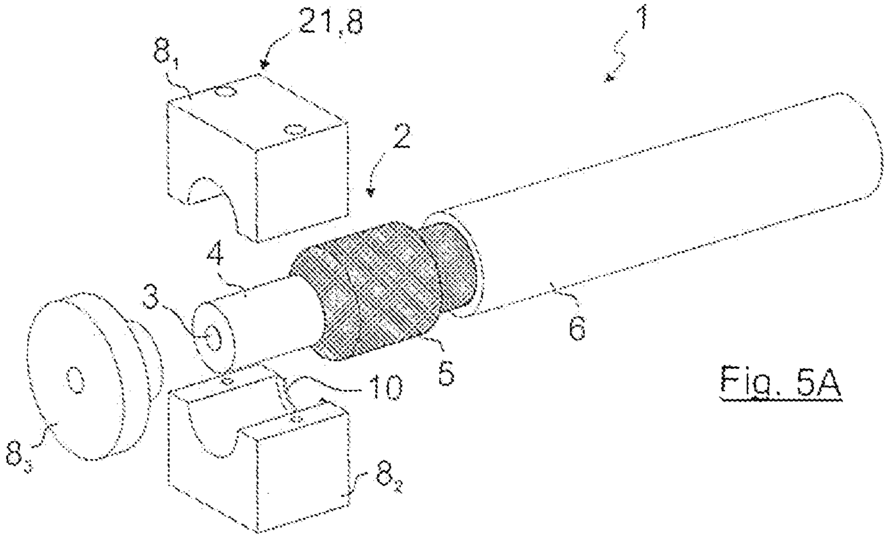
FIG. 5A is an isometric illustration of a third embodiment of an electrical cable to be fabricated showing a first of the individual fabrication steps.

To this end, the first longitudinal portion $L_1$ of the insulation element 4 in the prefabricated electrical cable 1 in terms of the cross-sectional area thereof is deformed in a stamping process using a stamping installation 8. The stamping installation 8 in this case, according to FIG. 5A, comprises a stamping ram $\mathbf{8}_1$ and a stamping die $\mathbf{8}_2$ which are in each case disposed or movable, respectively, radially in relation to the first longitudinal portion $L_1$ of the insulation element 4, and a stamping ram $\mathbf{8}_3$ which is movable axially in relation to the first longitudinal portion $L_1$ of the insulation element 4.

Figure 5B:
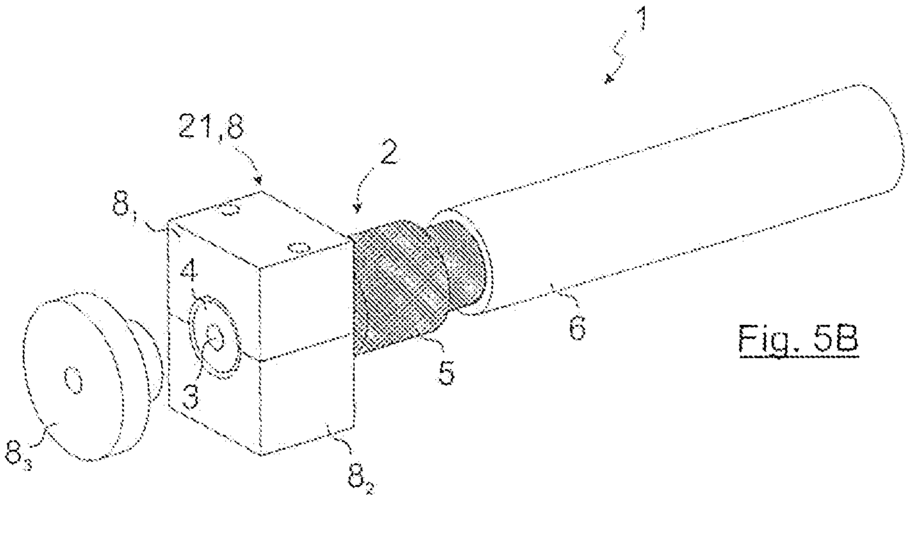
FIG. 5B is an isometric illustration of a third embodiment of an electrical cable to be fabricated showing a further of the individual fabrication steps.

The radially movable stamping ram $\mathbf{8}_1$ and stamping die $\mathbf{8}_2$ each have a semi-cylindrical recess, said recesses being in each case disposed opposite one another and in the stamping process according to FIG. 5B forming a common fully cylindrical recess into which the first longitudinal portion $L_1$ of the insulation element 4 is inserted. The internal diameter of the two semi-cylindrical recesses, or of the common fully cylindrical recess, respectively, is larger than the original external diameter of the first longitudinal portion $L_1$ of the insulation element 4 before the stamping process, as can be seen in FIG. 5B. The internal diameter of the semi-cylindrical recesses of the radially movable stamping ram $\mathbf{8}_1$ and of the stamping die $\mathbf{8}_2$ corresponds to the external diameter of the first longitudinal portion $L_1$ of the insulation element 4 after the stamping process according to FIGS. 5D and 5E.

A sharp-edged web 10 which in the stamping process scores a preferably fully circumferential groove 11 in the transition between the first longitudinal portion $L_1$ and the second longitudinal portion $L_2$ is likewise in each case configured on the cable-proximal end of the semi-cylindrical recesses of the radially movable stamping ram $\mathbf{8}_1$ and of the stamping die $\mathbf{8}_2$. The sharp-edged web 10 prevents a disadvantageous displacement of the insulation material from the first longitudinal portion $L_1$ in the direction of the second longitudinal portion $L_2$ of the insulation element 4 during the stamping process.

In a first step of the stamping process, the radially movable stamping ram $\mathbf{8}_1$ and the stamping die $\mathbf{8}_2$ are converged according to FIG. 5B and by way of the two semi-cylindrical recesses thereof form in each case a common fully cylindrical recess. The first longitudinal portion $L_1$ of the insulation element 4 is concentrically inserted into and positioned in this fully cylindrical recess of the stamping installation 8. The concentric positioning of the first longitudinal portion $L_1$ of the insulation element 4 within the common fully cylindrical recess of the radially movable stamping ram $\mathbf{8}_1$ and of the stamping die $\mathbf{8}_2$ is a substantial precondition for the concentricity between the inner conductor 3 and the completely stamped first longitudinal portion $L_1$ of the insulation element 4.

Figure 5C:
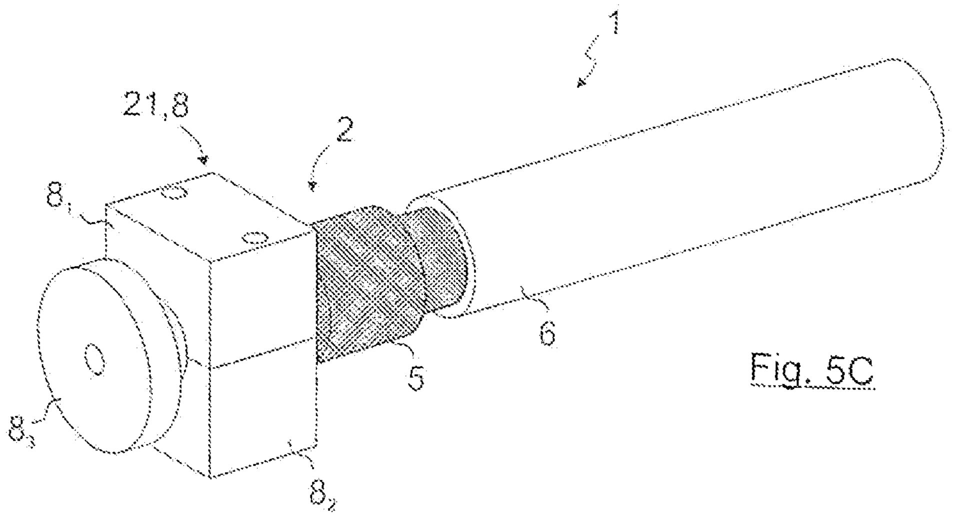
FIG. 5C is an isometric illustration of a third embodiment of an electrical cable to be fabricated showing a further of the individual fabrication steps.

In a second step of the stamping process according to FIG. 5C, the axially movable stamping ram $\mathbf{8}_3$ is pressed against the end face of the first longitudinal portion $L_1$ of the insulation element 4. As a result of this axial compression of the insulation element 4, the first longitudinal portion $L_1$ of the insulation element 4 is compressed, and the external diameter of the first longitudinal portion $L_1$ is enlarged in this way. The external diameter of the first longitudinal portion $L_1$ in the second step of the stamping process is enlarged to the size of the internal diameter of the common fully cylindrical recess of the radially movable stamping ram $\mathbf{8}_1$ and of the stamping die $\mathbf{8}_2$.

Figure 5D:
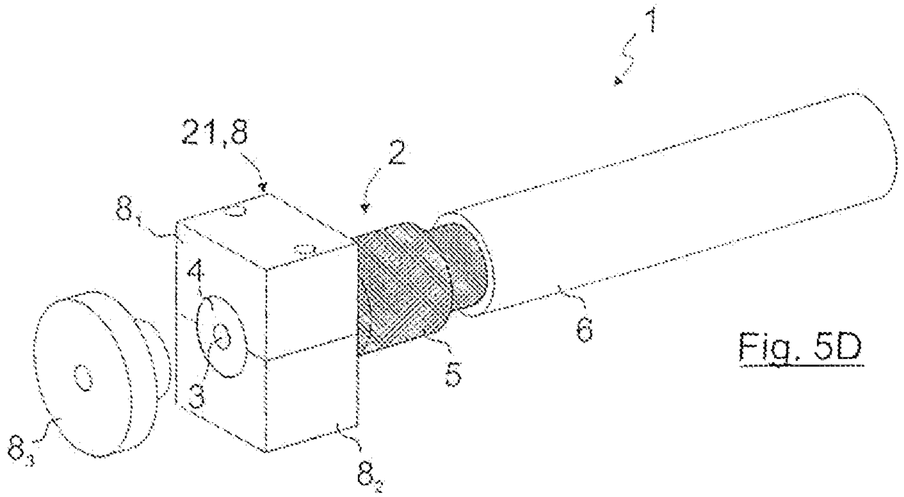
FIG. 5D is an isometric illustration of a third embodiment of an electrical cable to be fabricated showing a further of the individual fabrication steps.
Figure 5E:
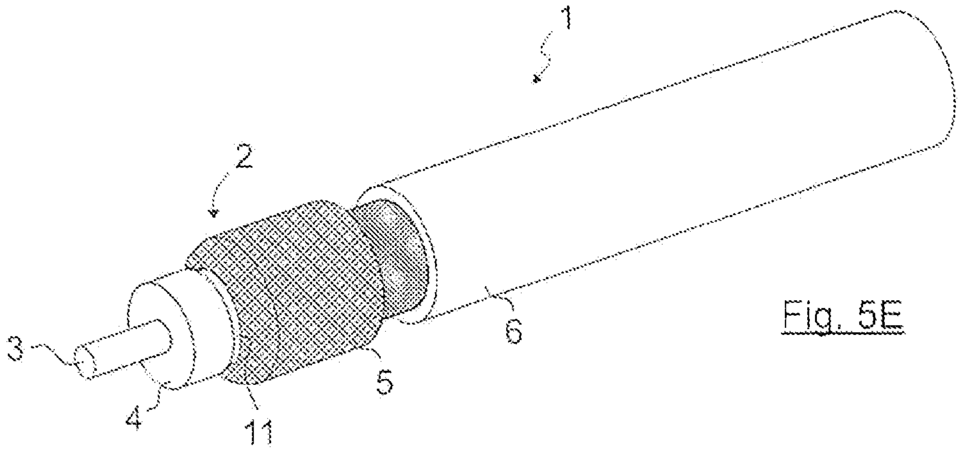
FIG. 5E is an isometric illustration of a third embodiment of an electrical cable to be fabricated showing a further of the individual fabrication steps.

The first longitudinal portion $L_1$ of the insulation element 4 and the inner conductor 3 enclosed therein thus fill the entire interior of the fully cylindrical recess of the stamping installation 8, as can be seen from FIG. 5D. As can be seen in FIG. 5E, the external diameter in the first longitudinal portion $L_1$ of the insulation element 4 at the end of the stamping process is enlarged in relation to the external diameter in the second longitudinal portion $L_2$ of the insulation element 4. The external diameter in the first longitudinal portion $L_1$ of the insulation element 4 at the end of the stamping process corresponds to the internal diameter in the first plug connector portion $S_1$ of the outer conductor contact element 14.

Figure 6A:
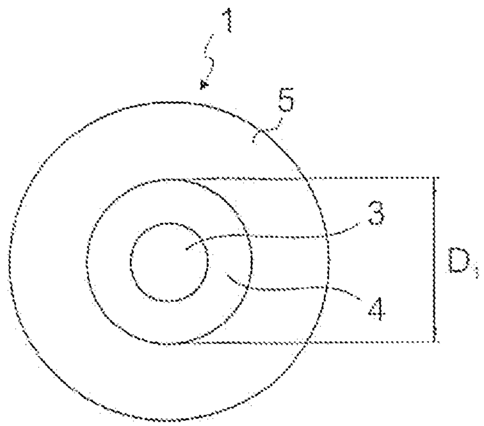
FIG. 6A is a first cross-sectional illustration of a third embodiment of an electrical cable to be fabricated according to the individual fabrication steps.
Figure 6B:
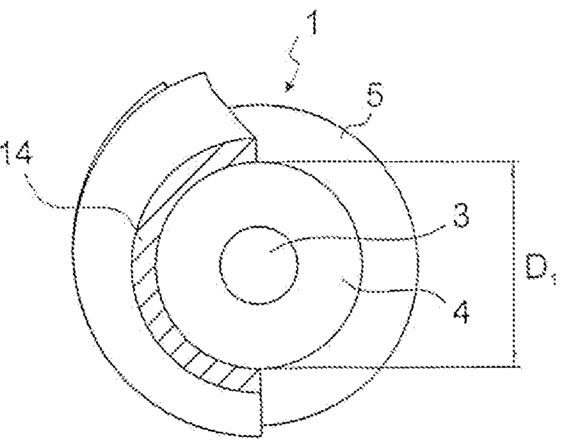
FIG. 6B is a second cross-sectional illustration of a third embodiment of an electrical cable to be fabricated according to the individual fabrication steps.

The cross-sectional profile of the substantial component parts of the third embodiment of the prefabricated electrical cable 1 according to the invention is in each case schematically illustrated, i.e. not true to scale, in the individual fabrication steps in FIGS. 6A and 6B:

The cross-sectional profile of a prefabricated electrical cable 1 before the stamping process is derived from FIG. 6A. The original external diameter $D_1$ of the first longitudinal portion $L_1$ of the insulation element 4 corresponds to the external diameter $D_1$ of the second longitudinal portion $L_2$ of the insulation element 4 and is smaller than the internal diameter $D_2$ of the first plug connector portion $S_1$ of the outer conductor contact element 14. As a result of the stamping process according to FIG. 6B, the diameter of the first longitudinal portion $L_1$ of the insulation element 4 is compressed from the smaller diameter $D_1$ to the larger diameter $D_2$, thus enabling the first longitudinal portion $L_1$ of the insulation element 4 to be inserted in a calibrated manner into the first plug connector portion $S_1$ of the outer conductor contact element 14.

Figure 7A:
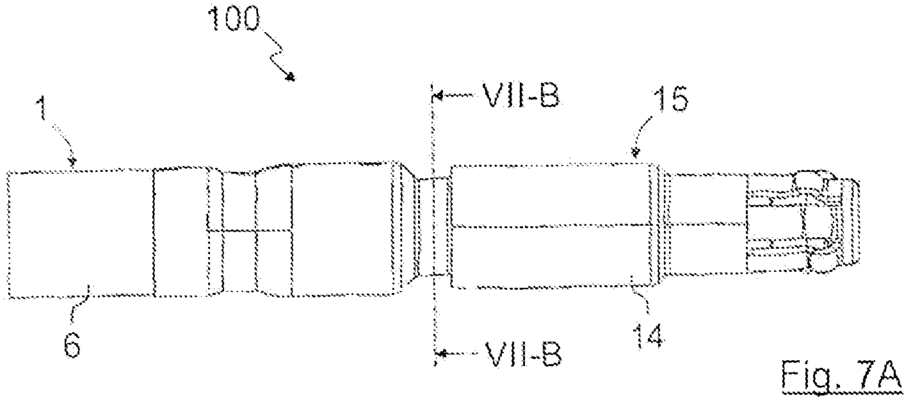
FIG. 7A shows a lateral view of a plug connector assembly.
Figure 7B:
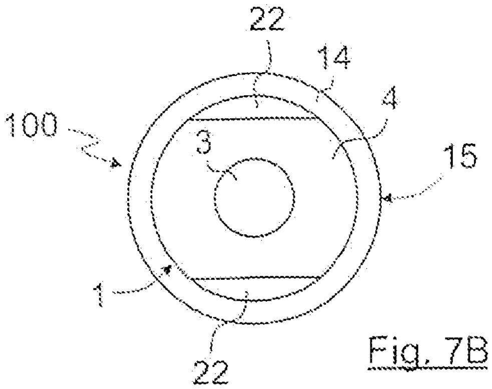
FIG. 7B shows a cross-sectional illustration of a plug connector assembly.

A plug connector assembly 100 is illustrated in the lateral view and in a cross-sectional illustration in FIGS. 7A and 7B:

The cross-sectional illustration is situated in the second plug connector portion $S_2$ of the plug connector 15 (cf, FIG. 2B) which preferably adjoins the first plug connector portion $S_1$. In this second plug connector portion $S_2$ an insulation element 4 is inserted within the outer conductor contact element 14, said insulation element 4 not fully filling the region between the outer conductor contact element 14 and the inner conductor contact element 16.

To this end, the insulation element 4 across the entire extent of the second plug connector portion $S_2$ has in each case at least one recess 22 (a total of two recesses 22 in the illustration of FIG. 7B). This at least one recess 22 is in each case designed on the sheath-proximal circumference of the insulation element 4, thus forming in each case a cavity between the outer conductor contact element 14 and the inner conductor contact element 16, said cavity being filled with air. As is known, the permittivity of air is one, while the permittivity of the dielectric material of the insulation element 4 is typically more than one. This results in an effective permittivity as a combination of the two dielectric materials in the second plug connector portion $S_2$ that is less than the permittivity of an insulation element 4 that completely fills the intermediate space between the outer conductor contact element 14 and the inner conductor contact element 16. In this way, the longitudinal portion $L_4$, when the insulation element 4 is designed with at least one recess 22, has a transmission characteristic which is more inductive than a fully cylindrically designed insulation element 4 that completely fills the intermediate region between the outer conductor contact element 14 and the inner conductor contact element 16. In this way, a capacitive discontinuity in the electrical cable 1 having an insulation element 4 designed in such a manner can be compensated for by virtue of an abrupt reduction of the cross-sectional area, and a signal transmission distance adapted to the impedance can be implemented across the entire longitudinal extent of the plug connector assembly 100.

Figure 8A:
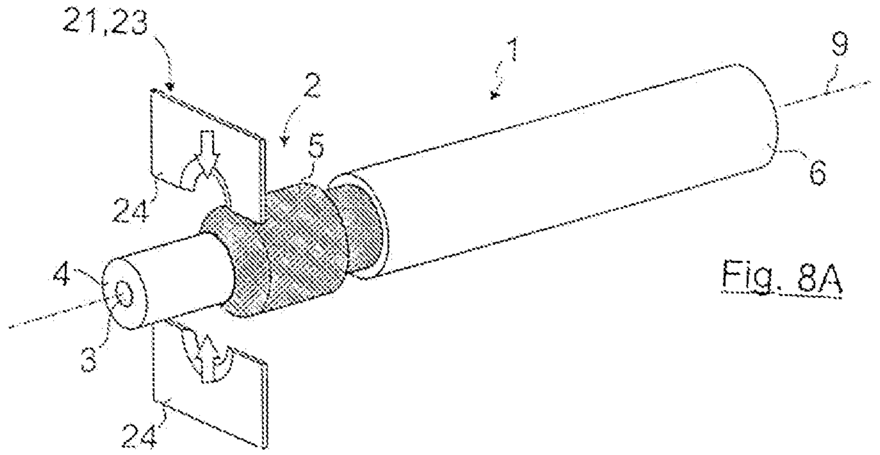
FIG. 8A is an isometric illustration of a fourth embodiment of an electrical cable to be fabricated, according to a first of the individual fabrication steps.
Figure 8B:
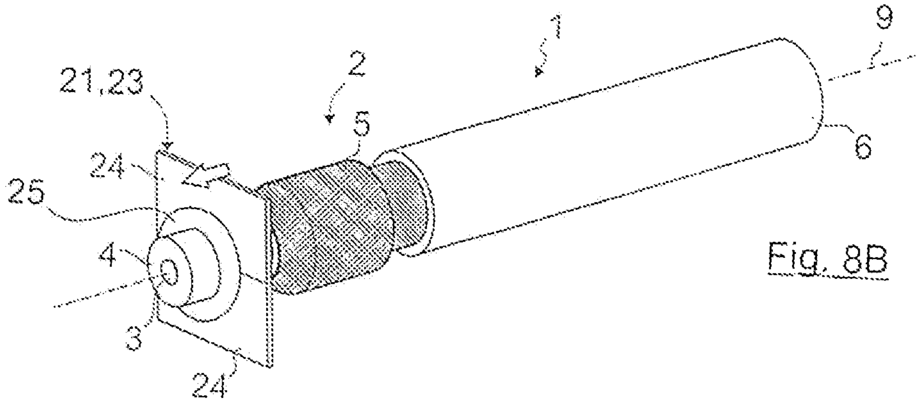
FIG. 8B is an isometric illustration of a fourth embodiment of an electrical cable to be fabricated, according to a further of the individual fabrication steps.
Figure 8C:
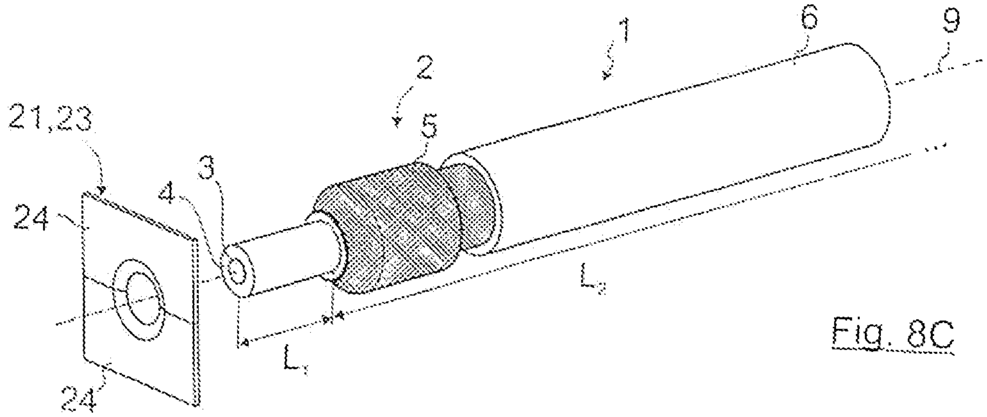
FIG. 8C is an isometric illustration of a fourth embodiment of an electrical cable to be fabricated, according to a further of the individual fabrication steps.

Finally, a further, very particularly advantageous, method for reducing the cross-sectional area in the first longitudinal portion $L_1$ of the insulation element 4 is described by means of FIGS. 8A to 8C. FIG. 8A shows an insulation element 4 which is not yet been machined; FIG. 8B shows the machining of the insulation element 4; and FIG. 8C shows the completely machined insulation element 4.

The processing installation 21 can have the separation tool 23 illustrated, the latter preferably having two shaped knives 24 that are adapted to the provided cross-sectional area of the first longitudinal portion $L_1$. The shaped knives 24 are disposed so as to be mutually opposite and are actuatable toward one another (cf. arrows in FIG. 8A) so as to score the insulation element 4 in the radial direction down to the provided depth.

A relative axial movement between the separation tool 23 and the cable 1 can subsequently be initiated, while the separation tool 23 is still situated within the insulation element 4, for example by a linear displacement of the separation tool 23, as is indicated in FIG. 8B. In this way, the excess insulation layer 25 to be removed can be peeled or scraped, respectively, from the remaining insulation element 4. The excess insulation layer 25 here can initially be pushed along in the manner of a bead in front of the shaped knives 24 until said bead reaches the end of the cable. This process can be advantageously facilitated by heating the insulation element 4, in particular when the separation tool 23, or the shaped knives 24 thereof, respectively, is/are heated. As a result thereof, the insulation layer 25 can become softer and thus easier to strip.

The insulation layer 25 which is displaced by the separation tool 23, in a manner analogous to the first embodiment, can be removed by means of a cutting apparatus in a cutting process, if required.

The exemplary embodiment of the invention described in FIGS. 8A to 8C can in principle be combined in an arbitrary manner with the exemplary embodiments, variants and refinements of the invention already described above. For example, in the case of a corresponding design embodiment of the blades of the shaped knives 24, it can also be provided, alternatively or additionally to removing the sleeve-shaped insulation layer 25, that a groove 11 and/or recesses 18 is/are incorporated in the insulation element 4 by the shaped knives 24.

While the present invention has been completely described above by means of preferred exemplary embodiments, said invention is not limited thereto but can be modified in various ways.

Operation

Having described the structure of my metallic plug connector component, and method and device for producing a metallic plug connector component, its operation is briefly described.

A principal object of the present invention is a plug connector assembly (100), comprising: a prefabricated electrical cable (1); and a plug connector (15) having an outer conductor contact element (14) that defines a first plug connector portion ($S_1$), and the plug connector (15) is connected to at least one cable end of the prefabricated electrical cable (1); and the prefabricated electrical cable (1), has an outer conductor shield (5) and an insulation element (4), and wherein the insulation element (4) has a first longitudinal portion ($L_1$) in which the insulation element (4) is laid bare from the outer conductor shield (5), and the insulation element (4) has a second longitudinal portion ($L_2$) which adjoins the first longitudinal portion ($L_1$) and in which the insulation element (4) is enclosed by the outer conductor shield (5), and wherein a cross-sectional area of the insulation element (4) in the first longitudinal portion ($L_1$) in relation to a cross-sectional area of the insulation element (4) in the second longitudinal portion ($L_2$) is modified in such a manner that the first longitudinal portion ($L_1$) is insertable into the first plug connector portion ($S_1$) of the outer conductor contact element (14) of the plug connector (15), and the insulation element (4) is calibrated to the outer conductor contact element (14) in the first longitudinal portion ($L_1$); and wherein the first longitudinal portion ($L_1$) of the insulation element (4) is inserted into the first plug connector portion ($S_1$).

A further object of the invention is a plug connector assembly (100) and wherein an external diameter of the second longitudinal portion ($L_2$) of the insulation element (4) differs from an internal diameter of the first plug connector portion ($S_1$) of the outer conductor contact element (14).

A further object of the invention is a plug connector assembly (100) and wherein within the first longitudinal portion ($L_1$) and the first plug connector portion ($S_1$) a region between the outer conductor contact element (14) and an inner conductor (3) of the prefabricated electrical cable (1) is completely filled by the insulation element (4).

A further object of the invention is a plug connector assembly (100) and wherein the insulation element (4) defines a preferably fully circumferential groove (11) in a transition between the first longitudinal portion ($L_1$) and the second longitudinal portion ($L_2$).

A further object of the invention is a plug connector assembly (100) and wherein the cross-sectional area of the insulation element (4) in the entire first longitudinal portion ($L_1$) is constant, and is reduced in size in relation to the cross-sectional area of the insulation element (4) in the second longitudinal portion ($L_2$).

A further object of the invention is a plug connector assembly (100) and wherein an external diameter of the insulation element (4) along the entire first longitudinal portion ($L_1$) is constant and is reduced in diameter in relation to an external diameter of the insulation element (4) in the second longitudinal portion ($L_2$).

A further object of the invention is a plug connector assembly (100) and wherein at least one recess (18), is configured on a circumference of the insulation element (4), said at least one recess (18) in the longitudinal direction extending in each case, across the entire first longitudinal portion ($L_1$).

A further object of the invention is a plug connector assembly (100) and wherein an external diameter of the insulation element (4) in the entire first longitudinal portion ($L_1$) is constant and is enlarged in diameter in relation to an external diameter of the insulation element (4) in the second longitudinal portion ($L_2$).

A further object of the invention is a plug connector assembly (100) and further comprising a chamfer on the insulation element (4) on a plug-proximal end of the first longitudinal portion ($L_1$).

A further object of the invention is a plug connector assembly (100) and wherein the outer conductor contact element (14) of the plug connector (15), has at least one dielectric material for compensation of a change in impedance between the first longitudinal portion ($L_1$) and the second longitudinal portion ($L_2$) and the at least one dielectric is situated in a second plug connector portion ($S_2$) that adjoins the first plug connector portion ($S_1$).

A further object of the invention is a method for fabricating an electrical cable (1) comprising the steps:—providing an electrical cable (1) that has an insulation element (4) in a first longitudinal portion ($L_1$); laying bare the insulation element (4) from an outer conductor shield (5) of the electrical cable (1), whereby a cross-sectional area of the insulation element (4) in the first longitudinal portion ($L_1$) in relation to a cross-sectional area of the insulation element (4) in a second longitudinal portion ($L_2$) that adjoins the first longitudinal portion ($L_1$) is modified; and providing a plug connector (15) that has an outer conductor contact element (14) that defines a first plug connector portion ($S_1$); and inserting a cable end of the electrical cable (1) into the outer conductor contact element (14) of the plug connector (15); and connecting the inserted electrical cable (1) to the outer conductor contact element (14); and wherein the cross-sectional area of the first longitudinal portion ($L_1$) in relation to the cross-sectional area of the second longitudinal portion ($L_2$) is modified in such a manner that the first longitudinal portion ($L_1$) is insertable into the first plug connector portion ($S_1$) of the outer conductor contact element (14) of the plug connector (15); and in the first longitudinal portion ($L_1$) the insulation element (4) is calibrated to the outer conductor contact element (14).

A further object of the invention is a method for fabricating an electrical cable (1) and wherein the modification of the cross-sectional area in the first longitudinal portion ($L_1$) takes place by means of compressing the first longitudinal portion ($L_1$).

A further object of the invention is a method for fabricating an electrical cable (1) and wherein the modification of the cross-sectional area in the first longitudinal portion ($L_1$) takes place by means of swaging the first longitudinal portion ($L_1$) in a forming process, preferably in a stamping or hot-stamping process.

A further object of the invention is a method for fabricating an electrical cable (1) and wherein the modification of the cross-sectional area in the first longitudinal portion ($L_1$) of the insulation element (4) is by means of a separation tool (23) that scores the insulation element (4) in a radial direction, and whereupon the separation tool (23) while in the radial cutting position is moved axially relative to the insulation element (4), and in a direction toward the cable end, so as to peel away an insulation layer (25) from the insulation element (4).

A further object of the invention is a method for fabricating an electrical cable (1) and wherein the separation tool (23) has at least one shaped knife (24) that is adapted to the shape of the provided cross-sectional area of the first longitudinal portion ($L_1$) and actuatable toward the insulation element (4).

A further object of the invention is a method for fabricating an electrical cable (1) and wherein the insulation material (4), at least in the first longitudinal portion ($L_1$), is heated immediately prior to and/or during the modification of the cross-sectional area.

A further object of the invention is a method for fabricating an electrical cable (1) and wherein the separation tool (23) is heated, preferably to an operating temperature between approximately 50° C. and 250° C.

A further object of the invention is a method for fabricating an electrical cable (1) and wherein in parallel to the modification of the cross-sectional area in the first longitudinal portion ($L_1$), a sharp-edged web (10) of a stamping installation (8) is scored into the insulation element (4) in a preferably fully circumferential groove (11) in a transition between the first longitudinal portion ($L_1$) and the second longitudinal portion ($L_2$).

A further object of the invention is a method for fabricating an electrical cable (1) and wherein the modification of the cross-sectional area in the first longitudinal portion ($L_1$) takes place by means of a separation process, preferably by a laser, photon, electron or ion beam, or a water jet.

A further object of the invention is an apparatus for fabrication of an electrical cable (1), comprising a processing installation (21) for modifying a cross-sectional area of the electrical cable (1) in a first longitudinal portion ($L_1$) of an insulation element (4) of the electrical cable (1) that has been laid bare from an outer conductor shield (5); and a joining installation (20) for inserting the electrical cable (1) into an outer conductor contact element (14) of a plug connector (15); and wherein, the processing installation (21) modifies a cross-sectional area of the insulation element (4) of the electrical cable (1) in the first longitudinal portion ($L_1$) in such a manner that the first longitudinal portion ($L_1$) is insertable into a first plug connector portion ($S_1$) of the outer conductor contact element (14); and wherein the first longitudinal portion ($L_1$) the insulation element (4) is calibrated to the outer conductor contact element (14).

A still further object of the invention is a method for fabricating an electrical cable (1) as claimed in claim 15 and wherein the separation tool (23) has at least two shaped knifes (24) that are adapted to the shape of the provided cross-sectional area of the first longitudinal portion ($L_1$) of the insulation element (4) and the two shaped knives (24) are actuatable toward one another.

An even still further object of the invention is a method for fabricating an electrical cable (1) as claimed in claim 15 and wherein the separation tool (23) is heated, preferably to an operating temperature between approximately between 170° C. and 200° C.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. A plug connector assembly (100), comprising:

a prefabricated electrical cable (1); and a plug connector (15) having an outer conductor contact element (14) that defines a first plug connector portion ($S_1$), and the plug connector (15) is connected to at least one cable end of the prefabricated electrical cable (1); and the prefabricated electrical cable (1), has an outer conductor shield (5) and an insulation element (4), and wherein the insulation element (4) has a first longitudinal portion ($L_1$) in which the insulation element (4) is laid bare from the outer conductor shield (5), and the insulation element (4) has a second longitudinal portion ($L_2$) which adjoins the first longitudinal portion ($L_1$) and in which the insulation element (4) is enclosed by the outer conductor shield (5), and wherein a cross-sectional area of the insulation element (4) in the first longitudinal portion ($L_1$) is modified so that a diameter of the cross-sectional area of the insulation element (4) in the first longitudinal portion ($L_1$) is different from a diameter of the cross-sectional area of the insulation element (4) in the second longitudinal portion ($L_2$); and the diameter of the cross-sectional area of the insulation element (4) in the first longitudinal portion ($L_1$) is calibrated to the outer conductor contact element (14) so that the modified first longitudinal portion ($L_1$) of the insulation element (4) may be inserted into the first plug connector portion ($S_1$); and wherein the modified cross-sectional area of the insulation element (4) may be Inserted into the first plug connector portion (S) without an intervening layer of air.

2. The plug connector assembly (100) as claimed in claim 1 and wherein an external diameter of the second longitudinal portion ($L_2$) of the Insulation element (4) differs from an internal diameter of the first plug connector portion ($S_1$) of the outer conductor contact element (14).

3. The plug connector assembly (100) as claimed in claim 1 and wherein within the first longitudinal portion ($L_1$) and the first plug connector portion ($S_1$) a region between the outer conductor contact element (14) and an inner conductor (3) of the prefabricated electrical cable (1) is completely filled by the insulation element (4).

4. The plug connector assembly (100) as claimed in claim 1 and wherein the insulation element (4) defines a circumferential groove (11) in a transition between the first longitudinal portion ($L_1$) and the second longitudinal portion ($L_2$).

5. The plug connector assembly (100) as claimed in claim 1 and wherein the cross-sectional area of the insulation element (4) in the entire first longitudinal portion ($L_1$) is constant, and is reduced in size in relation to the cross-sectional area of the insulation element (4) in the second longitudinal portion ($L_2$).

6. The plug connector assembly (100) as claimed in claim 1 and wherein an external diameter of the insulation element (4) along the entire first longitudinal portion ($L_1$) is constant and is reduced in diameter in relation to an external diameter of the insulation element (4) in the second longitudinal portion ($L_2$).

7. The plug connector assembly (100) as claimed in claim 1 and wherein at least one recess (18), is configured on a circumference of the insulation element (4), said at least one recess (18) in the longitudinal direction extending across the entire first longitudinal portion ($L_1$).

8. The plug connector assembly (100) as claimed in claim 1 and wherein an external diameter of the insulation element (4) in the entire first longitudinal portion ($L_1$) is constant and is enlarged in diameter in relation to an external diameter of the insulation element (4) in the second longitudinal portion ($L_2$).

9. The plug connector assembly (100) as claimed in claim 1 and wherein the outer conductor contact element (14) of the plug connector (15), has at least one insulating element (17) for compensation of a change in impedance between the first longitudinal portion ($L_1$) and the second longitudinal portion ($L_2$) and the at least one dielectric is situated in a second plug connector portion ($S_2$) that adjoins the first plug connector portion ($S_1$).

10. A method for fabricating an electrical cable (1) comprising the steps:

providing an electrical cable (1) that has an insulation element (4) in a first longitudinal portion ($L_1$) and in an adjoining second longitudinal portion ($L_2$);

laying bare the insulation element (4) from an outer conductor shield (5) of the electrical cable (1) in the first longitudinal portion ($L_1$);

modifying a cross-sectional area of the laid bare insulation element (4) in the first longitudinal portion ($L_1$) so that a diameter of the modified cross-sectional area of the insulation element (4) in the first longitudinal portion ($L_1$) is different from a diameter of the cross-sectional area of the insulation element (4) in the adjoining second longitudinal portion ($L_2$); and providing a plug connector (15) that has an outer conductor contact element (14) that defines a first plug connector portion ($S_1$); and calibrating the diameter of the modified cross-sectional area of the first longitudinal portion ($L_1$) of the insulation element (4) to the outer conductor contact element (14) so that the first longitudinal portion ($L_1$) of the insulation element (4) is insertable into the first plug connector portion ($S_1$); and inserting the modified cross-sectional area of the first longitudinal portion ($L_1$) of the insulation element (4) into the first plug connector portion ($S_1$) of the outer conductor contact element (14) of the plug connector (15); and inserting a cable end of the electrical cable (1) into the outer conductor contact element (14) of the plug connector (15); and connecting the inserted electrical cable (1) to the outer conductor contact element (14); and wherein the modified cross-sectional area of the insulation element (4) may be inserted into the first plug connector portion (S)) without an intervening layer of air.

11. The method for fabricating an electrical cable (1) as claimed in claim 10, and wherein the modification of the cross-sectional area in the first longitudinal portion ($L_1$) takes place by means of compressing the first longitudinal portion ($L_1$).

12. The method for fabricating an electrical cable (1) as claimed in claim 10 and wherein the modification of the cross-sectional area in the first longitudinal portion ($L_1$) takes place by means of swaging the first longitudinal portion ($L_1$) in a forming process, preferably in a stamping or hot-stamping process.

13. The method for fabricating an electrical cable (1) as claimed in claim 10 and wherein the modification of the cross-sectional area in the first longitudinal portion ($L_1$) of the insulation element (4) is by means of a separation tool (23) that scores the insulation element (4) in a radial direction, and whereupon the separation tool (23) while in the radial cutting position is moved axially relative to the insulation element (4), and in a direction toward the cable end, so as to peel away an insulation layer (25) from the insulation element (4).

14. The method for fabricating an electrical cable (1) as claimed in claim 13 and wherein the separation tool (23) has at least one shaped knife (24) that is adapted to the shape of the provided cross-sectional area of the first longitudinal portion ($L_1$) and actuatable toward the insulation element (4).

15. The method for fabricating an electrical cable (1) as claimed in claim 10 and wherein the insulation material (4), at least in the first longitudinal portion ($L_1$), is heated immediately prior to and/or during the modification of the cross-sectional area.

16. The method for fabricating an electrical cable (1) as claimed in claim 13 and wherein the separation tool (23) is heated, preferably to an operating temperature between approximately 50° C. and 250° C.

17. The method for fabricating an electrical cable (1) as claimed in claim 10 and wherein in parallel to the modification of the cross-sectional area in the first longitudinal portion ($L_1$), a sharp-edged web (10) of a stamping installation (8) is scored into the insulation element (4) in a preferably fully circumferential groove (11) in a transition between the first longitudinal portion ($L_1$) and the second longitudinal portion ($L_2$).

18. The method for fabricating an electrical cable (1) as claimed in claim 10 and wherein the modification of the cross-sectional area in the first longitudinal portion ($L_1$) takes place by means of a separation process, preferably by a laser, photon, electron or ion beam, or a water jet.

19. The method for fabricating an electrical cable (1) as claimed in claim 15 and wherein the separation tool (23) has at least two shaped knifes (24) that are adapted to the shape of the provided cross-sectional area of the first longitudinal portion ($L_1$) of the insulation element (4) and the two shaped knives (24) are actuatable toward one another.

20. The method for fabricating an electrical cable (1) as claimed in claim 13 and wherein the separation tool (23) is heated, preferably to an operating temperature between approximately between 170° C. and 200° C.

21. An apparatus for fabrication of an electrical cable (1), comprising:

a processing installation (21) for modifying a cross-sectional area of the electrical cable (1) in a first longitudinal portion ($L_1$) of an insulation element (4) of the electrical cable (1) that has been laid bare from an outer conductor shield (5); and a joining installation (20) for inserting the electrical cable (1) into an outer conductor contact element (14) of a plug connector (15); and wherein, the processing installation (21) modifies a cross-sectional area of the insulation element (4) of the electrical cable (1) in the first longitudinal portion ($L_1$) in such a manner that the first longitudinal portion ($L_1$) is insertable into a first plug connector portion ($S_1$) of the outer conductor contact element (14); and wherein the first longitudinal portion ($L_1$) the insulation element (4) is calibrated to the outer conductor contact element (14).

* * * * *